(12) United States Patent
Xu

(10) Patent No.: US 11,994,898 B2
(45) Date of Patent: May 28, 2024

(54) CLOCK DELAY DETECTION METHOD AND APPARATUS, CLOCK DELAY COMPENSATION METHOD AND APPARATUS, TERMINAL, AND READABLE STORAGE MEDIUM

(71) Applicant: ZTE Corporation, Shenzhen (CN)

(72) Inventor: Boxiong Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 141 days.

(21) Appl. No.: 17/641,958

(22) PCT Filed: Jul. 27, 2020

(86) PCT No.: PCT/CN2020/104938
§ 371 (c)(1),
(2) Date: Mar. 10, 2022

(87) PCT Pub. No.: WO2021/047313
PCT Pub. Date: Mar. 18, 2021

(65) Prior Publication Data
US 2022/0390979 A1    Dec. 8, 2022

(30) Foreign Application Priority Data
Sep. 12, 2019   (CN) .................. 201910867426.X

(51) Int. Cl.
*G06F 1/12*   (2006.01)
*G06F 1/10*   (2006.01)
(Continued)

(52) U.S. Cl.
CPC .................. *G06F 1/12* (2013.01); *G06F 1/10* (2013.01); *H04J 3/0682* (2013.01); *H04J 3/0685* (2013.01)

(58) Field of Classification Search
CPC .. G06F 1/12; G06F 1/10; H04J 3/0682; H04J 3/0685
See application file for complete search history.

(56) References Cited

U.S. PATENT DOCUMENTS 5,859,550 A    1/1999   Brandt
6,898,235 B1   5/2005   Carlin et al.
(Continued)

FOREIGN PATENT DOCUMENTS

CN   101430372 A    5/2009
CN   101888695 A   11/2010
(Continued)

OTHER PUBLICATIONS

International Searching Authority. International Search Report and Written Opinion for PCT Application No. PCT/CN2020/104938 and English translation, dated Oct. 28, 2020, pp. 1-9.
(Continued)

*Primary Examiner* — Xuxing Chen
(74) *Attorney, Agent, or Firm* — Vivacqua Crane, PLLC

(57) ABSTRACT

A clock delay detection method and apparats, a clock delay compensation method and apparatus, a terminal, and a readable storage medium. The clock delay detection method comprises: transmitting a first synchronization clock to a clock module to be detected by means of a first physical link (S101); receiving a feedback clock transmitted by said clock module by means of a second physical link and adjusted according to a phase of the first synchronization clock (S102); and thus determining the delay of said clock module according to the feedback clock, a self-return clock, a delay parameter corresponding to the first physical link, and a delay parameter corresponding to the second physical link (S103).

18 Claims, 9 Drawing Sheets

(51) Int. Cl.
*G06F 13/42* (2006.01)
*H04J 3/06* (2006.01)
*H04L 5/00* (2006.01)
*H04L 7/00* (2006.01)

(56) References Cited

U.S. PATENT DOCUMENTS

| | | | | |
|---|---|---|---|---|
| 9,547,332 | B1* | 1/2017 | Mizrahi | H04J 3/0697 |
| 10,416,704 | B2* | 9/2019 | Zhang | H04J 3/0638 |
| 2002/0110155 | A1 | 8/2002 | Pearce et al. | |
| 2010/0066424 | A1* | 3/2010 | Nakatani | G06F 1/12 |
| | | | | 327/237 |
| 2013/0287155 | A1 | 10/2013 | Nakamizo et al. | |
| 2016/0179129 | A1* | 6/2016 | Kim | G06F 1/12 |
| | | | | 327/144 |

FOREIGN PATENT DOCUMENTS

| | | |
|---|---|---|
| CN | 105680970 A | 6/2016 |
| CN | 106499389 A | 3/2017 |

OTHER PUBLICATIONS

European Patent Office. Extended European Search Report for EP Application No. 20862187.0, dated Sep. 9, 2022, pp. 1-10.

* cited by examiner

CLOCK DELAY DETECTION METHOD AND APPARATUS, CLOCK DELAY COMPENSATION METHOD AND APPARATUS, TERMINAL, AND READABLE STORAGE MEDIUM

CROSS-REFERENCE TO RELATED APPLICATION

This application is a national stage filing under 35 U.S.C. § 371 of international application number PCT/CN2020/104938, filed Jul. 27, 2020, which claims priority to Chinese patent application No. 201910867426.X, filed Sep. 12, 2019. The contents of these applications are incorporated herein by reference in their entirety.

TECHNICAL FIELD

The embodiment of the present disclosure relates to but is not limited to the technical field of communication, in particular relates to but is not limited to a clock delay detection method, a compensation method, a device, a terminal device, and a non-transitory computer-readable storage medium.

BACKGROUND

The system architecture of the switch clock is usually composed of a synchronous clock network distributed by the master clock. The slave clock of each business card receives the synchronous clock from the master clock through the backplane and synchronizes the frequency and phase of the slave clock. Due to the different routing lengths from the master clock to the backboard and connectors in different slot positions, different delay errors occur as the synchronous clock arrives at each service card, ranging from several nanoseconds to several hundred nanoseconds, resulting in delay errors between the phases of service cards in different slots and the reference phase of the master clock, such errors hinder the switch from proper operation in high-precision clock synchronization scenarios.

Generally, manual compensation of the delay phase of the synchronous clock is performed in a traditional manner in the existing communication equipment, in which the delay of the synchronous clock signal of the master clock module across the backplane, to the slave clock of the service card and to the chip to be synchronized, by an instrument having the function of time and phase detection, and then the delay is compensated in a quantitative and constant manner as the service is initiated. This compensation method still has errors above nanosecond level, because transmission delay for the same routing is different under different temperature conditions and different power supply voltages. Even under the same temperature conditions and the same power supply voltage, due to the production technology, it is challenging to determine the real delay on the boards produced in different batches by manual compensation, due to the problems of inconsistent line width control and inconsistent impedance matching. The error can only be narrowed in the range from tens to hundreds of nanoseconds to a few nanoseconds, and the detected delay error is still great. And the error that occurs in this delay compensation method will be out of limits for the application scenarios of high-precision clock synchronization, and the delay error is to be further reduced.

SUMMARY

There are provided a clock delay detection method, a compensation method, a device, a terminal and a non-transitory computer-readable storage medium in the embodiments of the present disclosure, which are intended to alleviate at least one of related technical problems, including how to further reduce the detection error of the delay caused by the clock distribution of a switch apparatus, thereby improving the accuracy of clock delay detection.

In view of this, an embodiment of the present disclosure provides a clock delay detection method, which may include, transmitting a first synchronous clock to a clock module to be detected through a first physical link; receiving a feedback clock transmitted by the clock module to be detected through a second physical link; the feedback clock is a clock generated by adjusting a phase of a current clock of the clock module to be detected to be the same as a phase of the first synchronous clock, and determining a delay of the clock module to be detected; the delay is determined based on the feedback clock, a self-loop back clock and delay parameters, the delay parameters may include a delay parameter corresponding to the first physical link and a delay parameter corresponding to the second physical link.

An embodiment of the present disclosure also provides a clock delay compensation method, which may include, acquiring the delay as described in any one of the above embodiments, and compensating the delay to the clock module to be detected corresponding to the delay.

An embodiment of the present disclosure also provides a clock delay detection device, which may include, a master clock module, a first physical link, a second physical link, and a clock module to be detected; the master clock module may include a transmitting module, a receiving module, and a calculating module; the transmitting module is configured to transmit a first synchronous clock to the clock module to be detected through the first physical link; the receiving module is configured to receive a feedback clock transmitted by the clock module to be detected through the second physical link, and the feedback clock is a clock generated by adjustment of a phase of a current clock of the clock module to be detected to be the same as a phase of the first synchronous clock; and the calculating module is configured to determine a delay of the clock module to be detected, the delay is determined based on the feedback clock, a self-loop back clock, and delay parameters including a delay parameter corresponding to the first physical link and a delay parameters corresponding to the second physical link.

An embodiment of the present disclosure also provides a clock delay compensation device, which may include the clock delay detection device as described in any one of the above embodiments and a compensating module; the compensating module is configured to acquire the delay detected by the clock delay detection device and to compensate for the delay to the clock module to be detected corresponding to the delay.

An embodiment of the present disclosure also provides a terminal device, which may include, a first processor, a first memory, and a first communication bus; the first communication bus is configured to implement a connection and communication between the first processor and the first memory, and the first processor is configured to execute at least one first computer program stored in the first memory to carry out the clock delay detection method as described in any one of the above embodiments.

An embodiment of the present disclosure also provides a terminal device, which may include, a second processor, a second memory and a second communication bus; the second communication bus is configured to implement a connection and communication between the second processor and the second memory, and the second processor is configured to execute at least one second computer program stored in the second memory to carry out the clock delay compensation method as described in any one of the above embodiments.

An embodiment of the present disclosure also provides a non-transitory computer-readable storage medium storing at least one first computer program executable by at least one first processor, which when executed by the first processor, cause the first processor to carry out clock delay detection method as described in any one of the above embodiments; or, the non-transitory computer-readable storage medium stores at least one second computer program executable by at least one second processor, which when executed by the second processor, causes the second processor to carry out the clock delay compensation method as described in any one of the above embodiments.

Other features and corresponding beneficial effects of the present disclosure will be illustrated in the following part of the specification, and it should be understood that at least part of the beneficial effects become apparent from the specification of the present disclosure.

Figure 1:
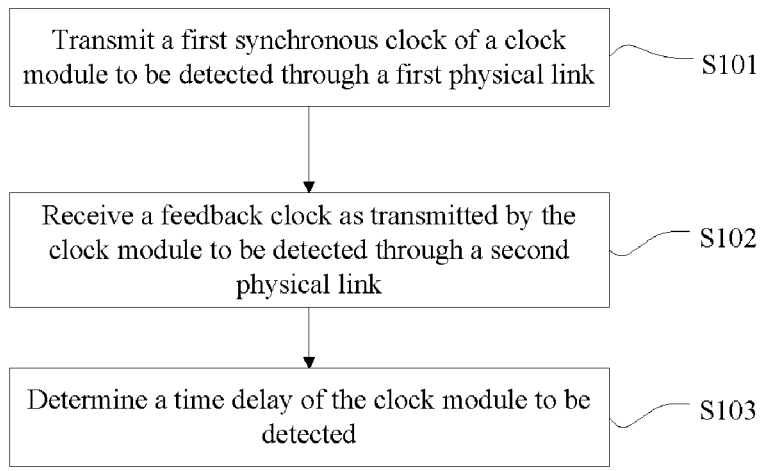
FIG. 1 depicts a flow chart of a delay detection method according to embodiment one of the present disclosure.

In the drawings, the reference labels are:
H1 Master clock module;
H2 Slave clock module;
H3 Transmission link with uplink and downlink channels between the master clock and the slave clock;
H4 Storage module;
H5 Temperature sensor;
H6 Voltage sensor;
C1 Clock chip of the master clock module;
C2 CPU chip;
C3 FLASH;
C4 Clock chip of slave clock module;
C5 MAC switching chip;
C6 Temperature sensor;
C7 Voltage sensor;
L1, L3 and L5 Clock downlink channel; and
L2 and L4 Clock uplink channel.

DETAILED DESCRIPTION

In order to illustrate the objectives, technical solutions and advantages of the present disclosure, some embodiments of the present disclosure will be further described in detail below through detailed embodiments in conjunction with the accompanying drawings. It should be understood that the detailed embodiments described here are intended to illustrate the present disclosure merely, and are not intended to limit the present disclosure.

Embodiment One

Referring to FIG. 1, a clock delay detection method according to this embodiment includes the following operations.

In S101, transmitting a first synchronous clock of a clock module to be detected through a first physical link.

In S102, receiving a feedback clock as transmitted by the clock module to be detected through a second physical link.

In S103, determining a time delay of the clock module to be detected.

In some embodiments, the clock delay detection method in the embodiments of the present disclosure is performed by a switch apparatus which includes but is not limited to, a master clock module, a transmission link, a clock module to be detected, or a storage module.

In particular, the master clock module is a core clock module in the switch apparatus, which functions to accept the synchronization from a clock device and apparatus, such as a time server, a GPS antenna, a BITS clock, 1588 module or the like, and can also synchronize with an internal device and apparatus such as a syncE clock, a TOD phase, time and other information, and has the functions of clock processing, synchronization, distribution, or the like. The master clock module may be implemented as hardware, such as a dedicated clock chip, a network processor with clock synchronization function, a single chip microcomputer, a field programmable gate array processor, or the like. One or more master clock modules may be provided. And several kinds of master clock modules may be used in combination. The master clock modules is a module capable of processing and distributing synchronous clocks.

The transmission link is a transmission medium that carries signals. The transmission link may be implemented as hardware, such as a circuit board, a connector, or a signal transmission medium like optical fiber or a network cable. In an embodiment of the present disclosure, the transmission link is divided into two physical links, with a first physical link as a downlink transmission link and a second physical link as an uplink transmission link. Signals are transmitted from the master clock module to the clock module to be detected, and then synchronized by the clock module to be detected and then transmitted back to the master clock module, such that closed-loop feedback is formed.

The clock module to be detected is a clock module distributed in the switch apparatus, i.e., a slave clock module, which functions to receive timing from the master clock module and synchronizes its frequency or phase, so that a clock of a service card is synchronized with the master clock module. The clock module to be detected may be implemented as hardware, such as a dedicated clock chip, a network processor, a single chip microcomputer, a field programmable gate array processor, or the like. One or more clock modules to be detected may be provided. And several kinds of clock modules to be detected may be used in combination. Generally, one or more clock module to be detected may be provided in a switch apparatus. Accordingly, one or more groups of the transmission link may be provided.

The storage module, which may be a volatile or nonvolatile memory with a storage function, a DDR, a FIFO, an array table, a register, or the like. One or more storage modules may be provided. And several kinds of storage modules may be used in combination.

In some embodiments, the feedback clock is a clock generated by adjusting the current clock of the clock module to be detected such that the current clock has the same phase as the first synchronous clock. In particular, the clock module to be detected, after receiving the first synchronous clock transmitted by the master clock module, locks the output clock of the clock module to the first synchronous clock, and performs a phase-locked loop zero-delay correction to the output clock with the first synchronous clock such that, the input and output clocks are in the same phase. At this point, the clock to be detected feeds the corrected output clock back to the master clock module as a feedback clock. In particular, the frequency of the output clock may be different from that of the first synchronous clock, but the frequency offset is identical with each other. It should be noted that in an embodiment of the present disclosure, the clock module to be detected may perform the phase correction with the zero-delay feature of the phase-locked loop. Alternatively, the clock module to be detected may not perform the phase correction with the zero-delay feature of the phase-locked loop, and may subsequently correct the error in phase by an algorithm. A person having ordinary skills in the art, is able to perform the error correction for the slave clock module in various manners without devoting creative efforts.

It should be noted that the clock frequency of the feedback clock is not fixed to a particular frequency, but the frequency may be set to 1 Hz, several KHz or several tens of MHz, or the like, and may be also set to be a multiple of the downlink synchronous clock frequency. One or more second physical links may be provided. It is not intended to specifically limit the number of the second physical links in the embodiment of the present disclosure, and the number may be varied as desired.

In some embodiments, the delay is determined based on a feedback clock, a self-loop back clock, and delay parameters which include a delay parameter corresponding to the first physical link and a delay parameter corresponding to the second physical link. It should be noted that the self-loop back clock is a self-loop back clock of the master clock module. The self-loop back clock may be acquired via an additional self feedback line in the master clock module, or may be acquired by internal feedback of the clock chip of the master clock module.

It should be noted that the clock frequency of the synchronous clock may not be fixed to a particular frequency, and the frequency may be set to 1 Hz, several KHz, several tens of MHz, or the like. One or more first physical links may be provided. It is not intended to specifically limit the number of the first physical links in the embodiment of the present disclosure, and the number may be varied as desired.

In some cases, the first physical link and the second physical link are usually implemented as physical boards of the same type. However, the first physical link and the second physical link are implemented as physical boards of different types in an embodiment of the present disclosure.

In some embodiments, determining the time delay of the clock module to be detected includes, acquiring a phase relationship between the feedback clock and the self-loop back clock, determining a corresponding delay value based on the phase relationship; acquiring a delay parameter which is determined based on the routing distance of each of the first physical link and the second physical link and a parameter of the physical board; and determining the delay based on to the delay value and delay parameter.

In some embodiments, acquiring the phase relationship between the feedback clock and the self-loop back clock includes, selecting clock data from the feedback clock and performing a phase detection on the clock data with the self-loop back clock to determine the phase relationship.

In some embodiments, the master clock chip in the master clock module performs the phase detection on a certain clock data from the feedback clock with the self-loop back clock by an internal phase detector, generates a phase difference, and completes a single delay sampling.

In some embodiments, acquiring the phase relationship between the feedback clock and the self-loop back clock and determining the corresponding delay value based on the phase relationship includes, acquiring at least two phase relationships between the feedback clock and the self-loop back clock, and determining at least two corresponding delay values based on the at least two phase relationships, and each of the at least two corresponding delay values corresponds to a respective one of the at least two phase relationships.

In some embodiments, the master clock chip in the master clock module performs the phase detection on at least two clock data from the feedback clock with the self-loop back clock by an internal phase detector, generates a phase difference respectively, and completes the delay sampling. For example, if the phase is detected 4000 times per second, 4000 samples are thus acquired, that is, 4000 phase relationships are generated, and 4000 delay values can be acquired based on these 4000 phase relationships. These 4000 delay values may be different from each other, or some of them may be the same while the others may be different, and also these 4000 delay values may be the same with each other, but this seldom happens. It should be noted that, one phase detector may be provided, or more than one phase detectors may be provided for fast acquisition of the phase relationship. The number of the phase detector may be varied as needed.

In some embodiments, a person having ordinary skills in the art may perform the phase detection by internal feedback from the clock chip based on the special functions of the clock chip, instead of the external feedback, for phase detection. The phase detection may be performed in various manners, such as measuring the cumulative number of pulses by a high-multiplier clock counter, measuring with an exclusive-or gate, or the like. It is not intended to limit how the phase detection is performed in this embodiment, and a person having ordinary skills in the art is able to perform the phase detection in various manners without devoting creative efforts. The frequency of phase detection is not limited to 4000 times per second, but may be ranged from once every few seconds to tens of thousands of times per second, which may be varied as needed.

In some embodiments, determining the delay based on the delay value and the delay parameter includes, processing at least two delay values based on a predetermined rule to generate a processed delay value, and determining the delay based on the processed delay value and the delay parameter.

In some embodiments, since a plurality of delay values are generated, the generated delay values can be stored in the storage module first, and the generated delay values are read after all sampling data is recorded (i.e., after all the required phase relationships between the feedback clock and the self-loop back clock are acquired, and after the corresponding delay values are determined based on the phase relationships), and are processed based on a predetermined rule to generate a processed delay value. It should be noted that the predetermined rule can be a sampling calculation method, an average calculation, a smooth filtering operation, a proportional integration operation, or the like. It is not intended to limit a particular operation or filtering for calculation of the delay in this embodiment. A person having ordinary skills in the art is able to perform a calculation of the delay based on the processed delay values, without devoting creative effort.

In some embodiments, in case that the physical board parameters of the first physical link and the second physical link are the same, while the physical links are in the same operating environment, then the delay parameter of each physical link is only related to the respective routing distance of each physical link.

It should be noted that the physical board parameters of the board are not only related to the line width control and impedance matching caused by the production process of the board, but are also related to the operating temperature and power supply voltage.

In some embodiments, prior to determining the delay of the clock module to be detected, the method further includes, acquiring at least one of following, an operating state of the clock module to be detected, a temperature of the clock module to be detected, a voltage of the clock module to be detected, or a determination as to whether a manual configuration presents in the clock module to be detected; and determining the delay of the clock to be detected in response to a presence of at least one of following, the operating state of the clock module to be detected is interrupted, the temperature of the clock module to be detected exceeds a predetermined temperature threshold, the voltage of the clock module to be detected exceeds a predetermined voltage threshold, or a manual configuration presents in the clock module to be detected.

In some embodiments, the master clock module can sense and mark the presence or absence of signals, power, clock frequency and other information from the feedback clock. One master clock module can be connected with a plurality of clock modules to be detected. In case that a plurality of clock modules to be detected are presented, the master clock module may read comprehensive information from each clock module to be detected through the feedback clock fed back by each clock module to be detected, and performed a determination to acquire the operating state of each clock module to be detected, and in turn the operating state of the service card to which the clock to be detected belongs. In addition, the master clock module can also feed back the in-place status, clock status, accuracy information and other information of the service card to which a respective one of the clock modules to be detected belongs, to a control plane management interface of an operating system in time. It can be understood that the above information may be read by the control plane management interface of the operating system as well.

Power consumption can be reduced by determining the delay of the clock to be detected in response to a presence of at least one of following, the operating state of the clock module to be detected is interrupted, the temperature of the clock module to be detected exceeds a predetermined temperature threshold, the voltage of the clock module to be detected exceeds a predetermined voltage threshold, a manual configuration presents in the clock module to be detected, or the like, since the measurement of the delay is performed only when one of the above situations presents.

The embodiment of the present disclosure provides a clock delay detection method, in which, the first synchronous clock of the clock module to be detected is transmitted through the first physical link, the adjusted feedback clock based on the phase of the first synchronous clock and transmitted by the clock module to be detected through the second physical link is received, and the delay of the clock module to be detected is determined based on the feedback clock, the self-loop back clock, the delay parameter corresponding to the first physical link and the delay parameter corresponding to the second physical link. The clock delay detection method according to an embodiment of the present disclosure, by taking into account the delay presents in the master clock module itself and the delay caused by the physical characteristics of the first physical link and the second physical link, the error in detection of the delay caused by the clock distribution of switch apparatus can be further reduced, thus improving the accuracy of clock delay detection.

In some embodiments, during the determination of the delay parameters, the physical board parameters of the boards of the first physical link and the second physical link are taken into account, which can further reduce the errors caused by the slight differences in manufacturing processes that lead to the substantial inconsistencies in the line width control, the impedance matching and the single preset standard delay between the first physical link and the second physical link. Also, the error caused by the actual delay of the first physical link and the second physical link being substantially inconsistent with the preset standard delay under different temperature conditions and power supply voltage conditions can be reduced.

In some embodiments, before determination of the delay of the clock module to be detected, information and data is acquired, such as the operating state of the clock module to be detected, the temperature of the clock module to be detected, the voltage of the clock module to be detected, and whether a manual configuration presents in the clock module to be detected. And a further determination is performed as to whether or not at least one of following conditions presents, the operating state of the clock module to be detected is interrupted, the temperature of the clock module to be detected exceeds a predetermined temperature threshold, the voltage of the clock module to be detected exceeds a predetermined voltage threshold, a manual configuration presents in the clock module to be detected, or the like. The waste of resources caused by continuous delay measurement can be avoided. The detection efficiency is further improved. Meanwhile, when the switching apparatus is in an environment with unstable temperature or in an environment with large fluctuation of power supply, the method according to an embodiment of the present disclosure can detect the delay change in time, automatically detect the delay, and improve the accuracy of the delay detection.

Embodiment Two

Figure 2:
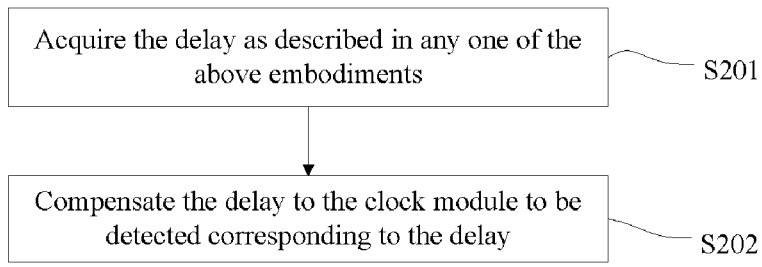
FIG. 2 depicts a flow chart of a delay compensation method according to embodiment two of the present disclosure.

Referring to FIG. 2, a clock delay compensation method according to this embodiment includes the following operations.

In S201, acquiring the delay as described in any one of the above embodiments.

In S202, compensating the delay to the clock module to be detected corresponding to the delay.

It should be noted that the compensation of the delay to the clock module to be detected corresponding to the delay can be performed either manually or automatically.

In some embodiments, the compensation of the delay to the clock module to be detected corresponding to the delay can be performed in various manners which include but are not limited to the following.

The delay is compensated to the constant delay storage of the clock module to be detected through a management interface. The clock module to be detected will remove the delay in the subsequent clock synchronization calculation.

Alternatively, the phase of the second synchronous clock is modified so that the second synchronous clock received by the clock module to be detected has been compensated for the delay. The second synchronous clock is the clock generated by an adjustment of the first synchronous clock based on the delay.

Alternatively, the output phase of the local clock of the clock module to be detected is modified to compensate for the delay.

It can be understood that the examples of several compensation methods discussed above are all automatic compensation methods. Specifically, automatic compensation can be performed through the following operations.

The master clock module automatically compensates the delay to the constant delay memory of the clock module to be detected through management interfaces such as SGMII, MLVDS, IIC, SPI line, or the like. Subsequently, the clock module to be detected removes the constant delay during clock synchronization calculation.

The phase of the first synchronous clock transmitted by the master clock module to any one of clock module to be detected is directly modified.

The local clock output phase of the clock module to be detected is directly modified to align with the first synchronous clock phase.

It should be noted that, a person having ordinary skills in the art is able to perform the automatic compensation of the clock delay in various manners without devoting creative effort.

In the clock delay compensation method according to the embodiment of the present disclosure, the delay provided in any one of the above embodiments is acquired and compensated to the clock to be detected. Delay with higher accuracy is compensated to the clock to be detected, so that the reliability of clock synchronization accuracy is guaranteed.

Furthermore, the embodiment of the present disclosure also provides an embodiment of automatic delay compensation. By means of automatic compensation, the uncontrollable delay error resulting from manual compensation can be greatly reduced, the delay error accuracy can be improved, and the clock synchronization accuracy of the switching apparatus can be greatly improved.

Embodiment Three

The clock delay detection method and compensation method according to the above embodiments will be illustrated with details by way of example in the following, in which the methods are performed by a rack switch.

It should be noted that the methods according to various embodiments of the present disclosure are not limited to be performed by a rack switch, and the following is described by way of example merely. Other switch apparatus that transmits synchronous clocks through physical links is also suitable for the methods according to the embodiment of the present disclosure.

Figure 3:
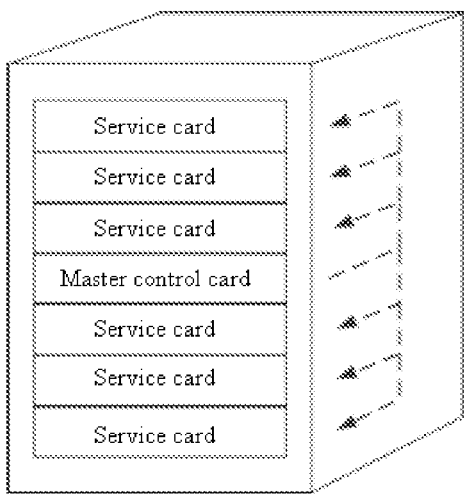
FIG. 3 depicts a schematic topology diagram of a rack switch according to embodiment three of the present disclosure.

FIG. 3 depicts a schematic topology diagram of a rack switch. The switch includes a master control card and a plurality of service cards.

Figure 4:
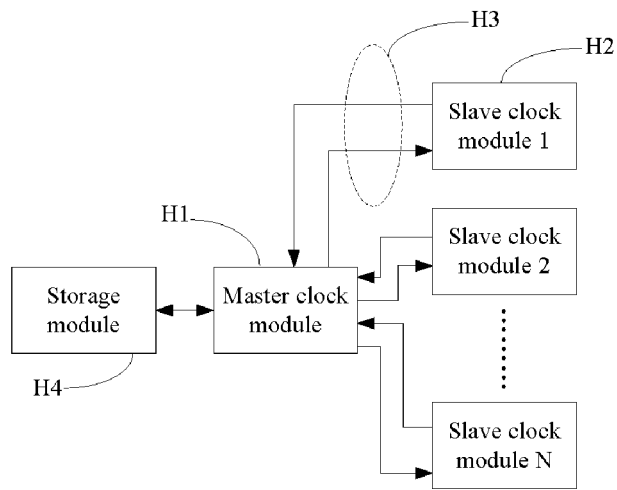
FIG. 4 depicts a topology diagram of the clock delay detection and compensation according to embodiment three of the present disclosure.
Figure 5:
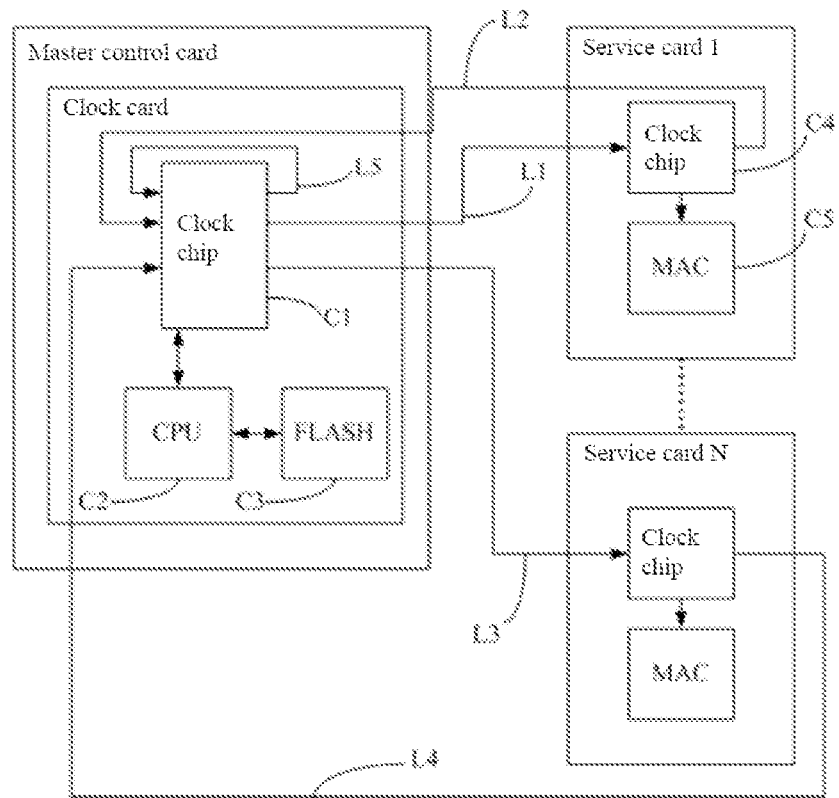
FIG. 5 depicts a device diagram of the hardware architecture of clock delay detection and compensation according to embodiment three of the present disclosure.
Figure 6:
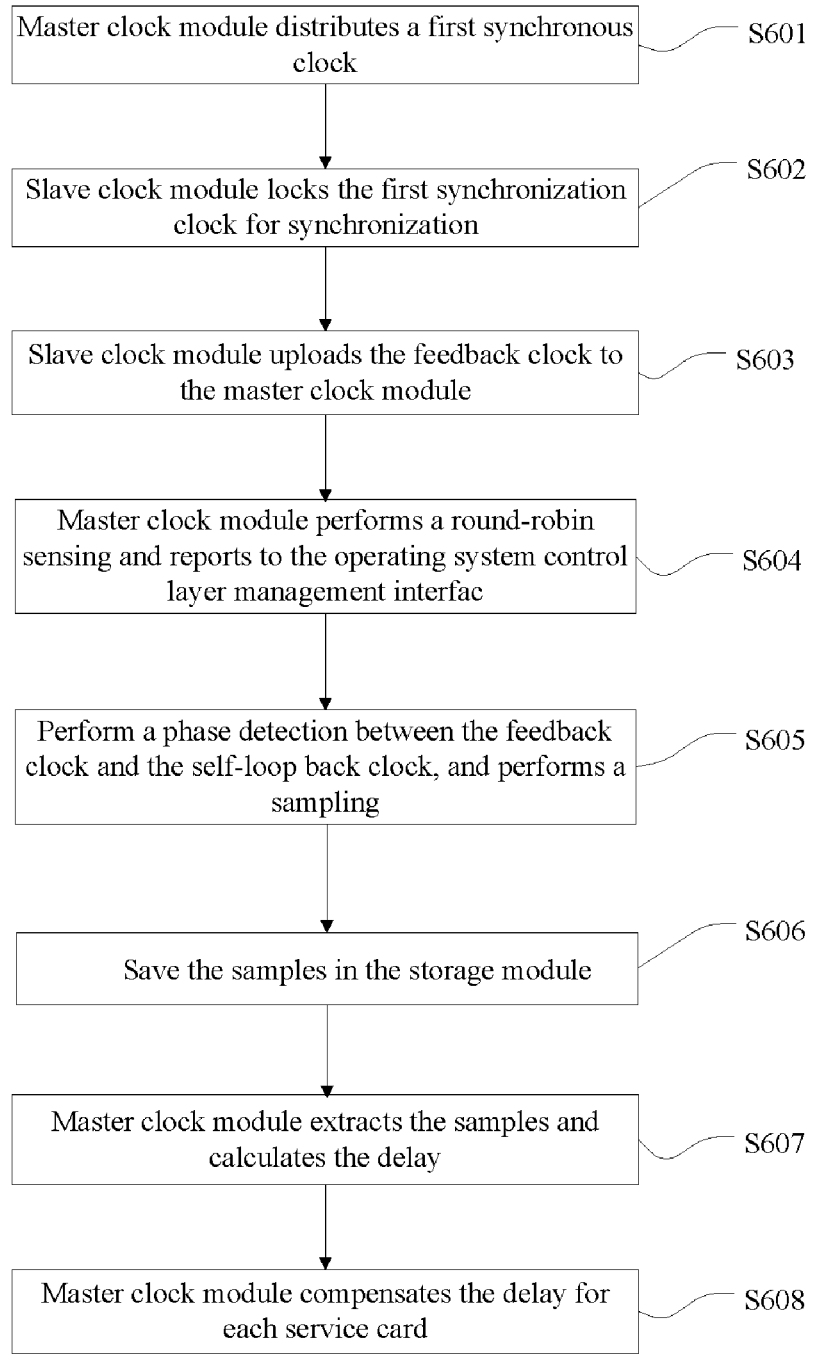
FIG. 6 depicts a flow chart of a particular clock delay detection method and compensation method according to embodiment three of the present disclosure.

FIG. 4 depicts a schematic topology diagram of a device for clock delay detection and compensation, the device includes a master clock module, a clock module to be detected, a storage module, a first physical link and a second physical link. For convenience of illustration, the clock module to be detected will be referred to as the slave clock module, the first physical link will be referred to as downlink, and the second physical link will be referred to as downlink. The detailed architecture in hardware of the device is shown in FIG. 5, which depicts the detailed architecture in hardware of the device for the clock delay detection as shown in FIG. 4. The architecture is rack architecture, in which a master control card and a plurality of service cards are included. A clock card is attached to the master control card. Clock chip C1 and CPU chip C2 of the master clock module of the clock card form the master clock module, in which CPU chip C2 is the chip for managing the clock and C3 is a FLASH memory. Clock chip C4 of the slave clock module and MAC switching chip C5 of the service card form the slave clock module. L1, L2, L3, L4 are connected with the master control card and the plurality of service cards through backplane physical transmission links. FIG. 6 depicts a specific clock delay detection method and compensation method.

In S601, the master clock module distributes a first synchronous clock.

In some embodiments, referring to FIG. 4 and FIG. 5, the master clock module distributing the first synchronous clock can be understood as that, the clock chip C1 of the master clock module on the master control card distributes the first synchronous clock to the service cards 1 to N through the downlink L1 and L3 respectively, and the clock chip C1 of the master clock module branches off a downlink L5, which is self-looped back to the input end of the clock chip C1 of the master clock module.

It should be noted that L5 is an external feedback phase detection method. According to the special functions of the clock chip, a person having ordinary skills in the art may remove the L5 feedback line and perform the phase detection with the internal feedback of the clock chip. The marked feedback line is taken as an example merely in this embodiment. Similarly, the clock frequency of the first synchronous clock is not fixed to a particular frequency, but the frequency may be set to 1 Hz, several KHz or several tens of MHz, or the like, which may be varied according to the actual situation. In addition, one or more downlinks may be provided. In this embodiment, two downlinks are taken as an example to better illustrate the transmission for multi-service cards, and it is not intended to specify the number of downlinks in the embodiments of the present disclosure, but which can be varied according to the actual situation.

In S602, the slave clock module locks the first synchronization clock for synchronization.

In some embodiments, referring to FIG. 4 and FIG. 5, after the service card 1 receives the first synchronization clock of downlink L1, the clock chip C4 of the clock module locks the clock output to L2 to the first synchronization clock input to L1, in which the two clocks may have different frequencies but the same frequency offset. Then a phase-locked loop zero delay correction is performed on the output clock and the input clock such that, the input and output clocks are in the same phase. And one part of the clock output from the clock chip C4 of the clock module synchronized with the first synchronization clock is supplied to the local MAC switching chip C5, with the other part transmitted to the master clock module as a feedback clock. It should be noted that in this embodiment, the clock module may perform the phase correction with the zero-delay feature of the phase-locked loop. Alternatively, the clock module to be detected may not perform the phase correction with the zero-delay feature of the phase-locked loop, and may subsequently correct the error in phase by an algorithm. A person having ordinary skills in the art, is able to perform the error correction for the slave clock module in various manners without devoting creative efforts. The clock frequency of the feedback clock is not fixed to a particular frequency, but the frequency may be set to 1 Hz, several KHz or several tens of MHz, or the like, and may be also set to be a multiple of the downlink synchronous clock frequency and may be varied according to the actual situation.

In S603, the slave clock module uploads the feedback clock to the master clock module.

In some embodiments, referring to FIGS. 4 and 5, the clock chip C4 of the slave clock module transmits the feedback clock back to the clock chip C1 of the master clock module through the uplink transmission link L2. Similarly, the process of the service card N is the same as that of the service card 1, and the feedback clock of the service card N is transmitted back to the clock chip C1 of the master clock module through the uplink transmission link L4. Here, it should be noted that one or more uplinks may be provided. In this embodiment, two uplinks are taken as an example to better illustrate the transmission for multi-service cards, and it is not intended to specify the number of uplinks in the embodiments of the present disclosure, but which can be varied according to the actual situation.

In S604, the master clock module performs a round-robin sensing and reports to the operating system control layer management interface.

In some embodiments, the clock chip C1 of the master clock module receives the feedback clock from the service card 1 and the service card N via the uplink transmission links L2 and L4. The clock chip C1 of the master clock module can sense and mark the presence of the signals, the power level, clock frequency and other information through the clocks fed back via the uplink feedback channel of each service card. Through the data link interface of the clock chip C1 of the master clock module, CPU C2 can read the comprehensive information of each clock link, perform determinations, detect the presence of the service cards and the operating condition of the clock of the service cards, and timely feed the card presence, clock status and precision information of service card in each slot to operating system control layer management interface. It is apparent that, this information can also be read by the operating system control layer management interface.

In S605, phase detection is performed between the feedback clock and the self-loop back clock, and a sampling is performed.

In some embodiments, the clock chip C1 of the master clock module performs a phase detection with an internal phase detector, between the feedback clock of one of the uplinks L2 and L4 of the service card and the self-loop back clock L5, such that a phase difference is generated, and a single delay sampling is completed. By repeating this operation, the samples for delay of the uplink clock fed back by a certain service card can be repeatedly collected. If the phase is detected 4000 times per second, 4000 samples are thus acquired. When the acquisition is completed, the phase detection input can be switched to the uplink clock fed back by the subsequent service card for phase detection, and phase detection can be performed with the self-loop back clock L5 to generate another phase difference. Here, one phase detector is taken as an example, and more than one phase detectors may be provided, so that simultaneous phase detection between the downlink synchronous clock and the uplink clocks fed back by the service cards can be performed for fast acquisition. And the number of the phase detectors can be varied according to the actual situation. The phase detection between the self-loop back clock L5 and the uplink feedback clock of a certain line card is an external feedback phase detection. The phase detection described in this embodiment is for example only, and a person having ordinary skills in the art may remove the L5 feedback line and perform the phase detection with the internal feedback of the clock chip, according to the special function of the clock chip. The phase detection may be performed in various manners, such as measuring the cumulative number of pulses by a high-multiplier clock counter, measuring with an exclusive-or gate, or the like. It is not intended to limit how the phase detection is performed in this embodiment, and a person having ordinary skills in the art is able to perform the phase detection in various manners without devoting creative efforts. The frequency of phase detection is not limited to 4000 times per second, but may be ranged from once every few seconds to tens of thousands of times per second, which may be varied as needed.

In S606, the samples are saved in the storage module.

In some embodiments, the CPU chip C2 sequentially writes the delay values of the service card in each slot sampled by the clock chip C1 of the master clock module into the memory module C3 for storage, thus recording the sampling data of the service card in each slot.

In S607, the master clock module extracts the samples and calculates the delay.

In some embodiments, the CPU chip C2 reads the delay samples stored in the memory module C3, and performs a sampling calculation sequentially based on the preset distances between the clock card and the uplink and downlink transmission links of each service card, and generates the delay of the service card in each slot. The sampling calculation method can be a sampling calculation method, an average calculation, a smooth filtering operation, a proportional integration operation, or the like. It is not intended to limit a particular operation or filtering for calculation of the delay in this embodiment. A person having ordinary skills in the art is able to perform a calculation of the delay in various manners, without devoting creative effort.

In S608, the master clock module compensates the delay for each service card.

In some embodiments, the CPU chip C2 automatically compensates the measured delay of each service card to each service card. In this embodiment, the phase control word of the clock chip C1 of the master clock module is directly modified, so that the output phase of the clock chip C4 of the slave clock module in any slot is the same as the self-loop back phase of the master clock chip. In particular, the automatic compensation may be performed in various manners, including but not limited to the following. 1. The master clock module automatically compensates the delay to the constant delay memory of the slave clock module of the service card through management interfaces such as SGMII, MLVDS, IIC and SPI line, and subsequently, the service card removes the constant delay during clock synchronization calculation. 2. Directly modifying the phase of the downlink synchronous clock from the master clock module to any slot. 3. Directly modifying the local clock output phase of the slave clock module so that the local clock output phase of the slave clock module is aligned with the synchronous clock phase. A person having ordinary skills in the art is able to perform the automatic compensation process for clock delay in various manners without devoting creative effort.

It should be noted that, according to the needs of a person having ordinary skills in the art, the delay of the module to be detected (the slave clock module) can also be compensated by manual compensation at this time.

It should be noted that if necessary, the above S601-S608 can be repeated several times to generate a more accurate clock delay compensation.

In some embodiments, the influence of temperature factors is also taken into account during the clock delay detection. As shown in the schematic diagram of clock delay detection and compensation topology in FIG. 7, a master clock module, a slave clock module, a temperature sensor, a storage module and an uplink transmission link and a downlink transmission link are included. The device can trigger measurement of the delay as needed instead of repeatedly measuring the delay, so as to achieve the purpose of reducing power consumption. The detailed architecture of the hardware devices is shown in FIG. 8, and the procedure of delay detection and compensation is shown in FIG. 9, the specific operations are described as follows.

In S901, the ambient temperature is recorded and a predetermined temperature threshold is set.

Figure 8:
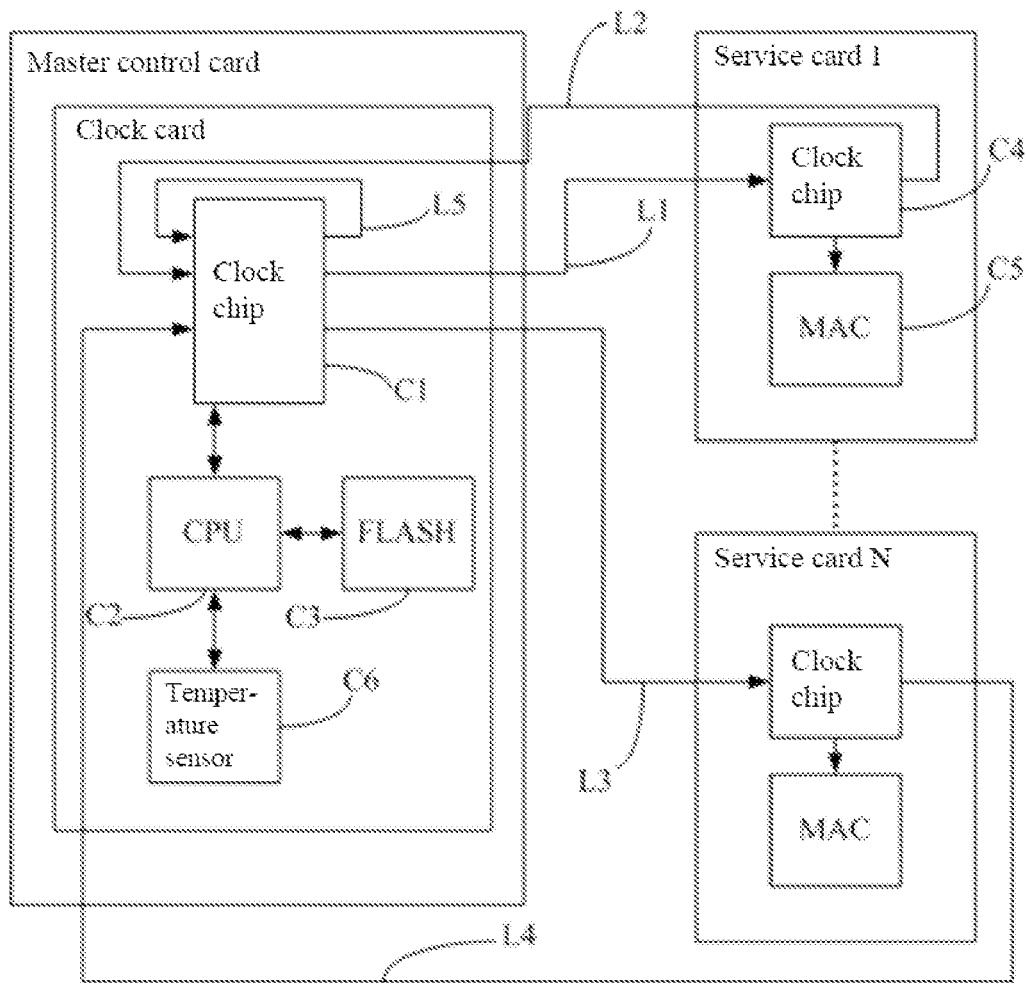
FIG. 8 depicts a device diagram of another hardware architecture of clock delay detection and compensation according to embodiment three of the present disclosure.
Figure 9:
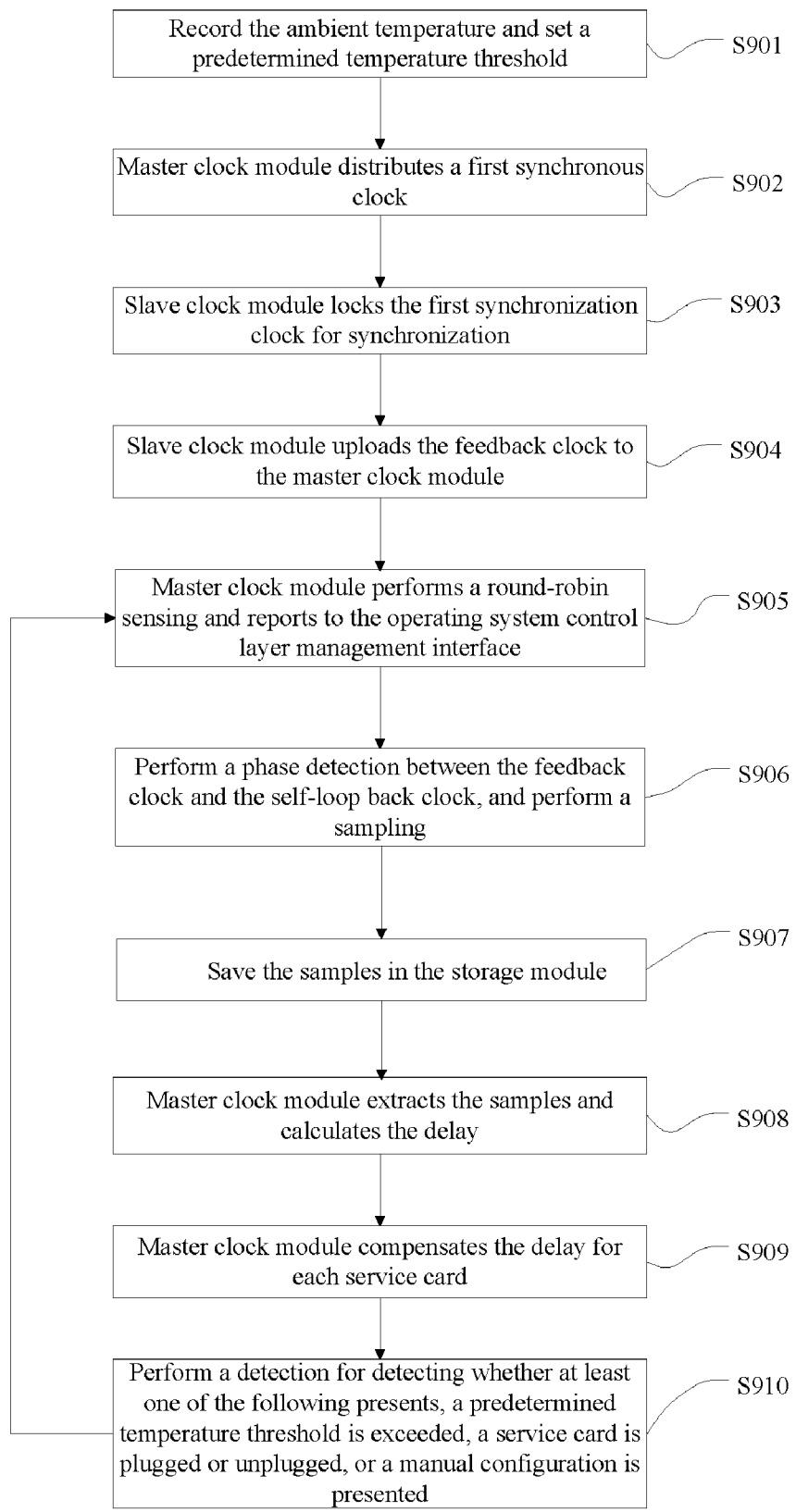
FIG. 9 depicts a flow chart of another particular clock delay detection method and compensation method according to embodiment three of the present disclosure.

As shown in FIG. 8, the current temperature of the temperature sensor C6 is recorded by the CPU chip C2, and a predetermined temperature threshold is set.

It should be noted that the predetermined temperature threshold may be set manually or automatically, and the threshold range may be varied according to the actual situation.

In S902, the master clock module distributes a first synchronous clock.

Figure 7:
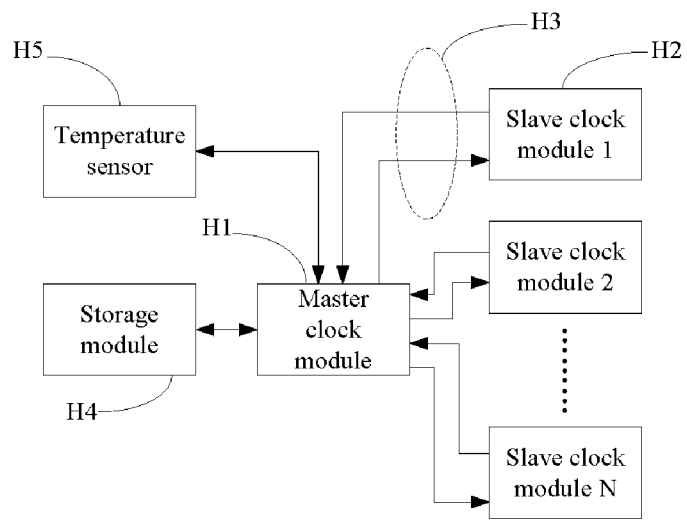
FIG. 7 depicts another topology diagram of clock delay detection and compensation according to embodiment three of the present disclosure.

In some embodiments, referring to FIG. 7 and FIG. 8, the master clock module distributing the first synchronous clock can be understood as that, the clock chip C1 of the master clock module on the master control card distributes the first synchronous clock to the service cards 1 to N through the downlink L1 and L3 respectively, and the clock chip C1 of the master clock module branches off a downlink L5, which is self-looped back to the input end of the clock chip C1 of the master clock module.

It should be noted that L5 is an external feedback phase detection method. According to the special functions of the clock chip, a person having ordinary skills in the art may remove the L5 feedback line and perform the phase detection with the internal feedback of the clock chip. The marked feedback line is taken as an example merely in this embodiment. Similarly, the clock frequency of the first synchronous clock is not fixed to a particular frequency, but the frequency may be set to 1 Hz, several KHz or several tens of MHz, or the like, which may be varied according to the actual situation. In addition, one or more downlinks may be provided. In this embodiment, two downlinks are taken as an example to better illustrate the transmission for multi-service cards, and it is not intended to specify the number of downlinks in the embodiments of the present disclosure, but which can be varied according to the actual situation.

In S903, the slave clock module locks the first synchronization clock for synchronization.

In some embodiments, referring to FIG. 7 and FIG. 8, after the service card 1 receives the first synchronization clock of downlink L1, the clock chip C4 of the clock module locks the clock output to L2 to the first synchronization clock input to L1, in which the two clocks may have different frequencies but the same frequency offset. Then a phase-locked loop zero delay correction is performed on the output clock and the input clock such that, the input and output clocks are in the same phase. And one part of the clock output from the clock chip C4 of the clock module synchronized with the first synchronization clock is supplied to the local MAC switching chip C5, with the other part transmitted to the master clock module as a feedback clock. It should be noted that in this embodiment, the clock module may perform the phase correction with the zero-delay feature of the phase-locked loop. Alternatively, the clock module to be detected may not perform the phase correction with the zero-delay feature of the phase-locked loop, and may subsequently correct the error in phase by an algorithm. A person having ordinary skills in the art, is able to perform the error correction for the slave clock module in various manners without devoting creative efforts. The clock frequency of the feedback clock is not fixed to a particular frequency, but the frequency may be set to 1 Hz, several KHz or several tens of MHz, or the like, and may be also set to be a multiple of the downlink synchronous clock frequency and may be varied according to the actual situation.

In S904, the slave clock module uploads the feedback clock to the master clock module.

In some embodiments, referring to FIGS. 7 and 8, the clock chip C4 of the slave clock module transmits the feedback clock back to the clock chip C1 of the master clock module through the uplink transmission link L2. Similarly, the process of the service card N is the same as that of the service card 1, and the feedback clock of the service card N is transmitted back to the clock chip C1 of the master clock module through the uplink transmission link L4. Here, it should be noted that one or more uplinks may be provided. In this embodiment, two uplinks are taken as an example to better illustrate the transmission for multi-service cards, and it is not intended to specify the number of uplinks in the embodiments of the present disclosure, but which can be varied according to the actual situation.

In S905, the master clock module performs a round-robin sensing and reports to the operating system control layer management interface.

In some embodiments, the clock chip C1 of the master clock module receives the feedback clock from the service card 1 and the service card N via the uplink transmission links L2 and L4. The clock chip C1 of the master clock module can sense and mark the presence of the signals, the power level, clock frequency and other information through the clocks fed back via the uplink feedback channel of each service card. Through the data link interface of the clock chip C1 of the master clock module, CPU C2 can read the comprehensive information of each clock link, perform determinations, detect the presence of the service cards and the operating condition of the clock of the service cards, and timely feed the card presence, clock status and precision information of service card in each slot to operating system control layer management interface. It is apparent that, this information can also be read by the operating system control layer management interface.

In S906, phase detection is performed between the feedback clock and the self-loop back clock, and a sampling is performed.

In some embodiments, the clock chip C1 of the master clock module performs a phase detection with an internal phase detector, between the feedback clock of one of the uplinks L2 and L4 of the service card and the self-loop back clock L5, such that a phase difference is generated, and a single delay sampling is completed. By repeating this operation, the samples for delay of the uplink clock fed back by a certain service card can be repeatedly collected. If the phase is detected 4000 times per second, 4000 samples are thus acquired. When the acquisition is completed, the phase detection input can be switched to the uplink clock fed back by the subsequent service card for phase detection, and phase detection can be performed with the self-loop back clock L5 to generate another phase difference. Here, one phase detector is taken as an example, and more than one phase detectors may be provided, so that simultaneous phase detection between the downlink synchronous clock and the uplink clocks fed back by the service cards can be performed for fast acquisition. And the number of the phase detectors can be varied according to the actual situation. The phase detection between the self-loop back clock L5 and the uplink feedback clock of a certain line card is an external feedback phase detection. The phase detection described in this embodiment is for example only, and a person having ordinary skills in the art may remove the L5 feedback line and perform the phase detection with the internal feedback of the clock chip, according to the special function of the clock chip. The phase detection may be performed in various manners, such as measuring the cumulative number of pulses by a high-multiplier clock counter, measuring with an exclusive-or gate, or the like. It is not intended to limit how the phase detection is performed in this embodiment, and a person having ordinary skills in the art is able to perform the phase detection in various manners without devoting creative efforts. The frequency of phase detection is not limited to 4000 times per second, but may be ranged from once every few seconds to tens of thousands of times per second, which may be varied as needed.

In S907, the samples are saved in the storage module.

In some embodiments, the CPU chip C2 sequentially writes the delay values of the service card in each slot sampled by the clock chip C1 of the master clock module into the memory module C3 for storage, thus recording the sampling data of the service card in each slot.

In S908, the master clock module extracts the samples and calculates the delay.

In some embodiments, the CPU chip C2 reads the delay samples stored in the memory module C3, and performs a sampling calculation sequentially based on the preset distances between the clock card and the uplink and downlink transmission links of each service card, and generates the delay of the service card in each slot. The sampling calculation method can be a sampling calculation method, an average calculation, a smooth filtering operation, a proportional integration operation, or the like. It is not intended to limit a particular operation or filtering for calculation of the delay in this embodiment. A person having ordinary skills in the art is able to perform a calculation of the delay in various manners, without devoting creative effort.

In S909, the master clock module compensates the delay for each service card.

In some embodiments, the CPU chip C2 automatically compensates the measured delay of each service card to each service card. In this embodiment, the phase control word of the clock chip C1 of the master clock module is directly modified, so that the output phase of the clock chip C4 of the slave clock module in any slot is the same as the self-loop back phase of the master clock chip. In particular, the automatic compensation may be performed in various manners, including but not limited to the following. 1. The master clock module automatically compensates the delay to the constant delay memory of the slave clock module of the service card through management interfaces such as SGMII, MLVDS, IIC and SPI line, and subsequently, the service card removes the constant delay during clock synchronization calculation. 2. Directly modifying the phase of the downlink synchronous clock from the master clock module to any slot. 3. Directly modifying the local clock output phase of the slave clock module so that the local clock output phase of the slave clock module is aligned with the synchronous clock phase. A person having ordinary skills in the art is able to perform the automatic compensation process for clock delay in various manners without devoting creative effort.

It should be noted that a person having ordinary skills in the art may also compensate the above delay to the slave clock module (the clock module to be detected) through manual compensation.

At this time, the master clock chip C1 has compensated the calculated delay error to each line card.

In S910, detection is performed for detecting whether at least one of the following presents, a predetermined temperature threshold is exceeded, a service card is plugged or unplugged, or a manual configuration is presented.

In some embodiments, in response to a detection that the temperature of the temperature sensor exceeds the predetermined temperature threshold, the CPU chip C2 triggers an interrupt and returns to S905; in response to a detection that the service card is plugged or unplugged, the CPU chip C2 triggers an interrupt and returns to S905; and in response to a detection that the management interface is manually configured for delay detection, the CPU chip C2 triggers an interrupt and returns to S905. The above three interrupt mechanisms are only taken for examples in this embodiment, and a person having ordinary skills in the art can make additions and removals according to actual needs without creative effort.

In some embodiments, the influence of voltage factor is also taken into account during the clock delay detection, and detection and compensation for the voltage factor is similar to the above-mentioned detection and compensation in which only temperature factor is taken into account, and a person having ordinary skills in the art can easily achieve the detection and compensation for the voltage factor based on the above-mentioned temperature influence, which will not be repeated here.

In some embodiments, not only the influence of temperature, but also the influence of voltage is taken into account in the clock delay detection method and compensation method. In addition to the temperature sensor, a voltage sensor is also provided in the clock delay detection device, as shown in the topology diagram of clock delay detection and compensation in FIG. 10, in which a master clock module, a slave clock module, a temperature sensor, a voltage sensor, a storage module and an uplink transmission link and a downlink transmission link are included. Instead of repeatedly measuring the delay, the measurement for the delay is triggered as needed for reducing power consumption. The detailed architecture of the hardware devices is shown in FIG. 11, and the procedure of delay detection and compensation is shown in FIG. 12, the specific operations are described as follows.

In S1201, an ambient temperature and a voltage are recorded, and a predetermined temperature threshold and a predetermined voltage threshold are set.

Figure 11:
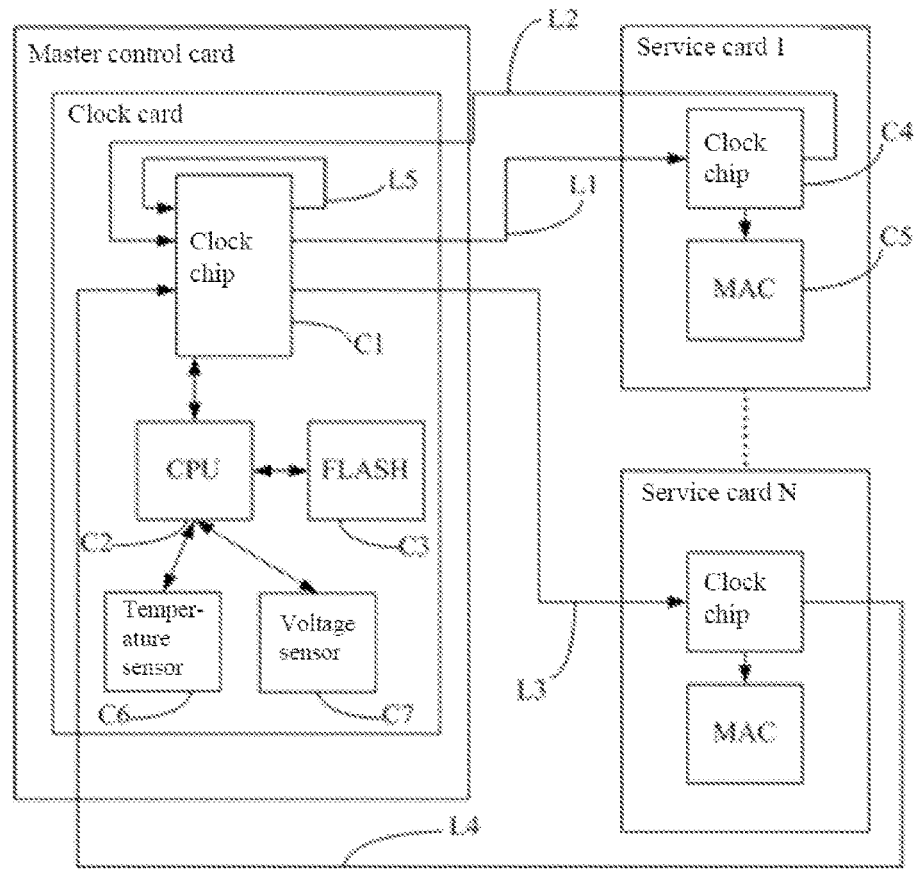
FIG. 11 depicts a device diagram of another hardware architecture of clock delay detection and compensation according to embodiment three of the present disclosure.
Figure 12:
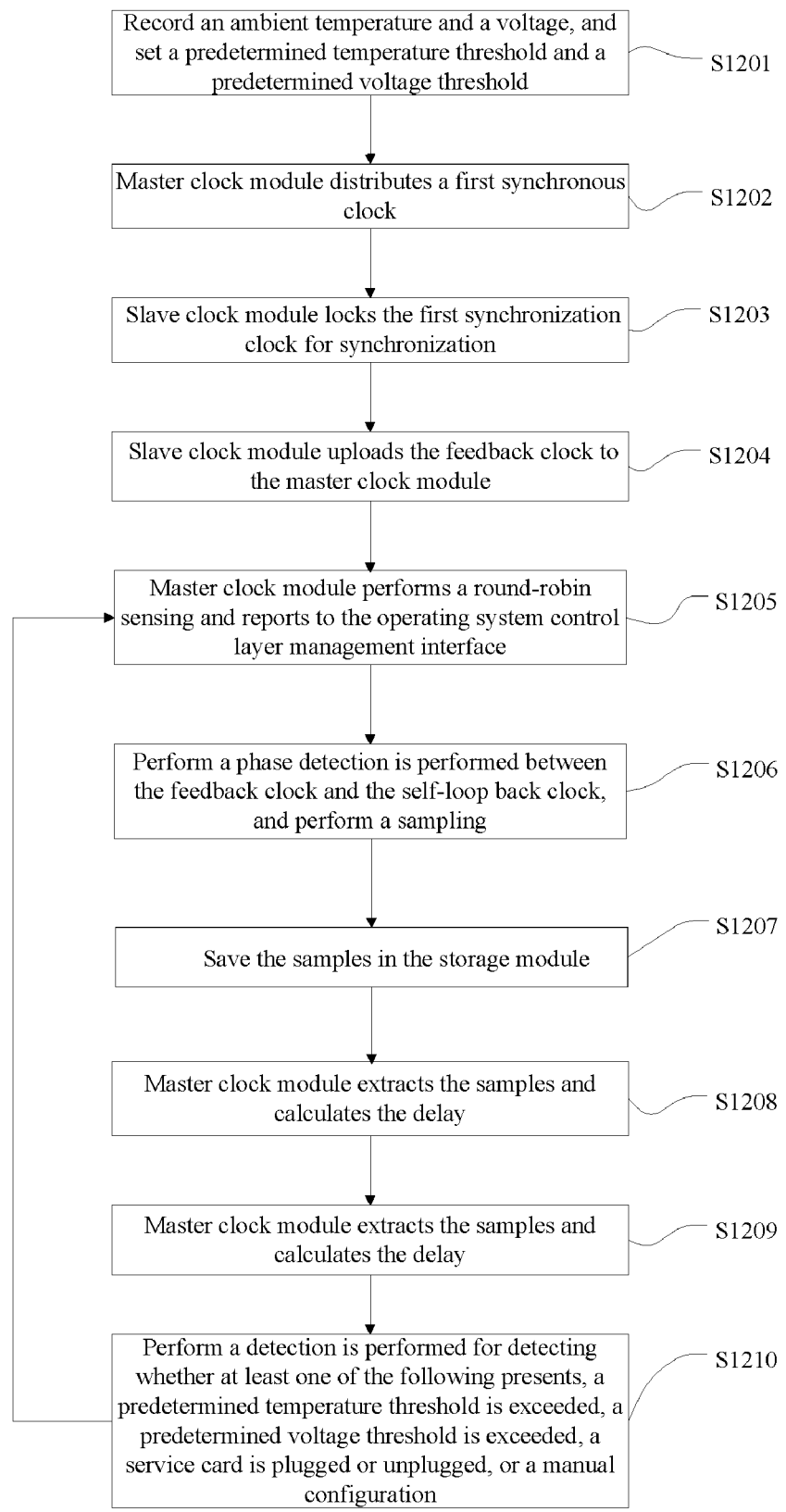
FIG. 12 depicts a flow chart of another particular clock delay detection method and compensation method according to embodiment three of the present disclosure.

As shown in FIG. 11, the current temperature of the temperature sensor C6 is recorded by the CPU chip C2, and a predetermined temperature threshold is set.

It should be noted that the predetermined temperature threshold may be set manually or automatically, and the threshold range may be varied according to the actual situation.

In S1202, the master clock module distributes a first synchronous clock.

Figure 10:
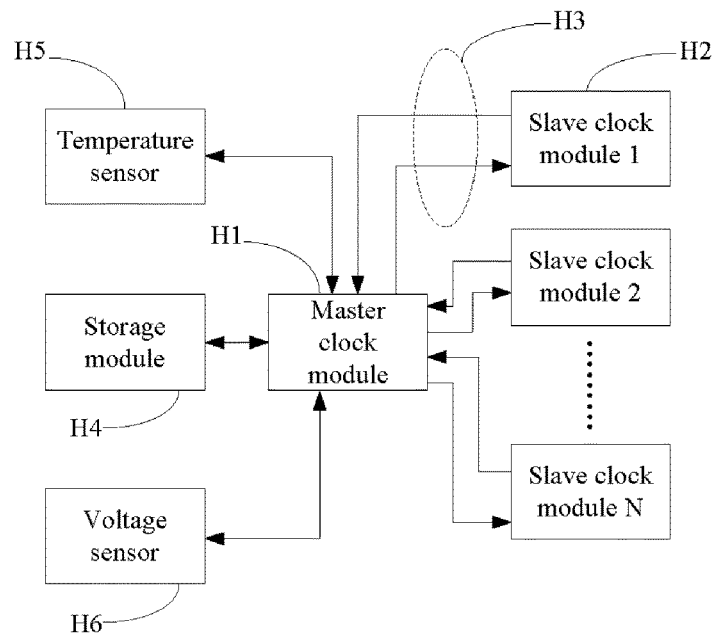
FIG. 10 depicts another topology diagram of clock delay detection and compensation according to embodiment three of the present disclosure.

In some embodiments, referring to FIG. 10 and FIG. 11, the master clock module distributing the first synchronous clock can be understood as that, the clock chip C1 of the master clock module on the master control card distributes the first synchronous clock to the service cards 1 to N through the downlink L1 and L3 respectively, and the clock chip C1 of the master clock module branches off a downlink L5, which is self-looped back to the input end of the clock chip C1 of the master clock module.

It should be noted that L5 is an external feedback phase detection method. According to the special functions of the clock chip, a person having ordinary skills in the art may remove the L5 feedback line and perform the phase detection with the internal feedback of the clock chip. The marked feedback line is taken as an example merely in this embodiment. Similarly, the clock frequency of the first synchronous clock is not fixed to a particular frequency, but the frequency may be set to 1 Hz, several KHz or several tens of MHz, or the like, which may be varied according to the actual situation. In addition, one or more downlinks may be provided. In this embodiment, two downlinks are taken as an example to better illustrate the transmission for multi-service cards, and it is not intended to specify the number of downlinks in the embodiments of the present disclosure, but which can be varied according to the actual situation.

In S1203, the slave clock module locks the first synchronization clock for synchronization.

In some embodiments, referring to FIG. 10 and FIG. 11, after the service card 1 receives the first synchronization clock of downlink L1, the clock chip C4 of the clock module locks the clock output to L2 to the first synchronization clock input to L1, in which the two clocks may have different frequencies but the same frequency offset. Then a phase-locked loop zero delay correction is performed on the output clock and the input clock such that, the input and output clocks are in the same phase. And one part of the clock output from the clock chip C4 of the clock module synchronized with the first synchronization clock is supplied to the local MAC switching chip C5, with the other part transmitted to the master clock module as a feedback clock. It should be noted that in this embodiment, the clock module may perform the phase correction with the zero-delay feature of the phase-locked loop. Alternatively, the clock module to be detected may not perform the phase correction with the zero-delay feature of the phase-locked loop, and may subsequently correct the error in phase by an algorithm. A person having ordinary skills in the art, is able to perform the error correction for the slave clock module in various manners without devoting creative efforts. The clock frequency of the feedback clock is not fixed to a particular frequency, but the frequency may be set to 1 Hz, several KHz or several tens of MHz, or the like, and may be also set to be a multiple of the downlink synchronous clock frequency and may be varied according to the actual situation.

In S1204, the slave clock module uploads the feedback clock to the master clock module.

In some embodiments, referring to FIGS. 10 and 11, the clock chip C4 of the slave clock module transmits the feedback clock back to the clock chip C1 of the master clock module through the uplink transmission link L2. Similarly, the process of the service card N is the same as that of the service card 1, and the feedback clock of the service card N is transmitted back to the clock chip C1 of the master clock module through the uplink transmission link L4. Here, it should be noted that one or more uplinks may be provided. In this embodiment, two uplinks are taken as an example to better illustrate the transmission for multi-service cards, and it is not intended to specify the number of uplinks in the embodiments of the present disclosure, but which can be varied according to the actual situation.

In S1205, the master clock module performs a round-robin sensing and reports to the operating system control layer management interface.

In some embodiments, the clock chip C1 of the master clock module receives the feedback clock from the service card 1 and the service card N via the uplink transmission links L2 and L4. The clock chip C1 of the master clock module can sense and mark the presence of the signals, the power level, clock frequency and other information through the clocks fed back via the uplink feedback channel of each service card. Through the data link interface of the clock chip C1 of the master clock module, CPU C2 can read the comprehensive information of each clock link, perform determinations, detect the presence of the service cards and the operating condition of the clock of the service cards, and timely feed the card presence, clock status and precision information of service card in each slot to operating system control layer management interface. It is apparent that, this information can also be read by the operating system control layer management interface.

In S1206, phase detection is performed between the feedback clock and the self-loop back clock, and a sampling is performed.

In some embodiments, the clock chip C1 of the master clock module performs a phase detection with an internal phase detector, between the feedback clock of one of the uplinks L2 and L4 of the service card and the self-loop back clock L5, such that a phase difference is generated, and a single delay sampling is completed. By repeating this operation, the samples for delay of the uplink clock fed back by a certain service card can be repeatedly collected. If the phase is detected 4000 times per second, 4000 samples are thus acquired. When the acquisition is completed, the phase detection input can be switched to the uplink clock fed back by the subsequent service card for phase detection, and phase detection can be performed with the self-loop back clock L5 to generate another phase difference. Here, one phase detector is taken as an example, and more than one phase detectors may be provided, so that simultaneous phase detection between the downlink synchronous clock and the uplink clocks fed back by the service cards can be performed for fast acquisition. And the number of the phase detectors can be varied according to the actual situation. The phase detection between the self-loop back clock L5 and the uplink feedback clock of a certain line card is an external feedback phase detection. The phase detection described in this embodiment is for example only, and a person having ordinary skills in the art may remove the L5 feedback line and perform the phase detection with the internal feedback of the clock chip, according to the special function of the clock chip. The phase detection may be performed in various manners, such as measuring the cumulative number of pulses by a high-multiplier clock counter, measuring with an exclusive-or gate, or the like. It is not intended to limit how the phase detection is performed in this embodiment, and a person having ordinary skills in the art is able to perform the phase detection in various manners without devoting creative efforts. The frequency of phase detection is not limited to 4000 times per second, but may be ranged from once every few seconds to tens of thousands of times per second, which may be varied as needed.

In S1207, the samples are saved in the storage module.

In some embodiments, the CPU chip C2 sequentially writes the delay values of the service card in each slot sampled by the clock chip C1 of the master clock module into the memory module C3 for storage, thus recording the sampling data of the service card in each slot.

In S1208, the master clock module extracts the samples and calculates the delay.

In some embodiments, the CPU chip C2 reads the delay samples stored in the memory module C3, and performs a sampling calculation sequentially based on the preset distances between the clock card and the uplink and downlink transmission links of each service card, and generates the delay of the service card in each slot. The sampling calculation method can be a sampling calculation method, an average calculation, a smooth filtering operation, a proportional integration operation, or the like. It is not intended to limit a particular operation or filtering for calculation of the delay in this embodiment. A person having ordinary skills in the art is able to perform a calculation of the delay in various manners, without devoting creative effort.

In S1209, the master clock module compensates the delay for each service card.

In some embodiments, the CPU chip C2 automatically compensates for the measured delay of each service card to each service card. In this embodiment, the phase control word of the clock chip C1 of the master clock module is directly modified, so that the output phase of the clock chip C4 of the slave clock module in any slot is the same as the self-loop back phase of the master clock chip. In particular, the automatic compensation may be performed in various manners, including but not limited to the following. 1. The master clock module automatically compensates the delay to the constant delay memory of the slave clock module of the service card through management interfaces such as SGMII, MLVDS, IIC and SPI line, and subsequently the service card removes the constant delay during clock synchronization calculation. 2. Directly modifying the phase of the downlink synchronous clock from the master clock module to any slot. 3. Directly modifying the local clock output phase of the slave clock module so that the local clock output phase of the slave clock module is aligned with the synchronous clock phase. A person having ordinary skills in the art is able to perform the automatic compensation process for clock delay in various manners without devoting creative effort.

It should be noted that a person having ordinary skills in the art may also compensate for the delay to the slave clock module (the clock module to be detected) through manual compensation.

At this time, the master clock chip C1 has compensated the calculated delay error to each line card.

In S1210, detection is performed for detecting whether at least one of the following presents, a predetermined temperature threshold is exceeded, a predetermined voltage threshold is exceeded, a service card is plugged or unplugged, or a manual configuration is presented.

In some embodiments, in response to a detection that the temperature of the temperature sensor exceeds the predetermined temperature threshold, the CPU chip C2 triggers an interrupt and returns to S1205; in response to a detection that the voltage of the voltage sensor exceeds the predetermined temperature threshold, the CPU chip C2 triggers an interrupt and returns to S1205; in response to a detection that the service card is plugged or unplugged, the CPU chip C2 triggers an interrupt and returns to S1205; and in response to a detection that the management interface is manually configured for delay detection, the CPU chip C2 triggers an interrupt and returns to S1205. The above four interrupt mechanisms are only taken for examples in this embodiment, and a person having ordinary skills in the art can make additions and removals according to actual needs without creative effort.

Embodiment Four

Figure 13:
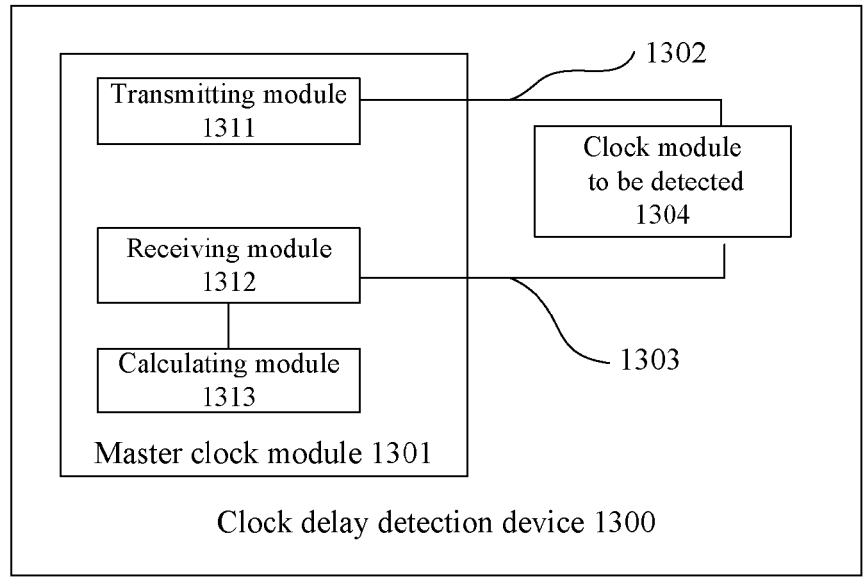
FIG. 13 depicts a schematic diagram of components of a clock delay detection device according to embodiment four of the present disclosure.

Referring to FIG. 13, a clock delay detection device 1300 according to this embodiment includes,
a master clock module 1301, a first physical link 1302, a second physical link 1303 and a clock module to be detected 1304.

The master clock module 1301 includes a transmitting module 1311, a receiving module 1312 and a calculating module 1313.

The transmitting module 1311 is configured for transmitting a first synchronization clock to the clock module to be detected 1304 through the first physical link 1302.

The receiving module 1312 is configured for receiving a feedback clock transmitted by the clock module to be detected 1304 through the second physical link 1303. The feedback clock is the clock generated by adjusting the current clock of the clock module to be detected, such that the current clock of the clock module to be detected has the same phase as the first synchronous clock.

The calculating module 1313 is configured for determining a delay of the clock module 1304 to be detected. The delay is determined based on the feedback clock, a self-loop back clock and delay parameters including delay parameters corresponding to the first physical link 1302 and the delay parameters corresponding to the second physical link 1303.

In some embodiments, the clock delay detection device in an embodiment of the present disclosure may be a switch apparatus, which includes but is not limited to, a master clock module, a transmission link, a clock module to be detected, and a storage module.

In particular, the master clock module is a core clock module in the switch apparatus, which functions to accept the synchronization from a clock device and apparatus, such as a time server, a GPS antenna, a BITS clock, 1588 module or the like, and can also synchronize with an internal device and apparatus such as a syncE clock, a TOD phase, time and other information, and has the functions of clock processing, synchronization, distribution, or the like. The master clock module may be implemented as hardware, such as a dedicated clock chip, a network processor with clock synchronization function, a single chip microcomputer, a field programmable gate array processor, or the like. One or more master clock modules may be provided. And several kinds of master clock modules may be used in combination. The master clock modules is a module capable of processing and distributing synchronous clocks.

The transmission link is a transmission medium that carries signals. The transmission link may be implemented as hardware, such as a circuit board, a connector, or a signal transmission medium like optical fiber or a network cable. In an embodiment of the present disclosure, the transmission link is divided into two physical links, with a first physical link as a downlink transmission link and a second physical link as an uplink transmission link. Signals are transmitted from the master clock module to the clock module to be detected, and then synchronized by the clock module to be detected and then transmitted back to the master clock module, such that closed-loop feedback is formed.

The clock module to be detected is a clock module distributed in the switch apparatus, i.e., a slave clock module, which functions to receive timing from the master clock module and synchronizes its frequency or phase, so that a clock of a service card is synchronized with the master clock module. The clock module to be detected may be implemented as hardware, such as a dedicated clock chip, a network processor, a single chip microcomputer, a field programmable gate array processor, or the like. One or more clock modules to be detected may be provided. And several kinds of clock modules to be detected may be used in combination. Generally, one or more clock module to be detected may be provided in a switch apparatus. Accordingly, one or more groups of the transmission link may be provided.

The storage module, which may be a volatile or nonvolatile memory with a storage function, a DDR, a FIFO, an array table, a register, or the like. One or more storage modules may be provided. And several kinds of storage modules may be used in combination.

In some embodiments, the feedback clock is a clock generated by adjusting the current clock of the clock module to be detected such that the current clock has the same phase as the first synchronous clock. In particular, the clock module to be detected, after receiving the first synchronous clock transmitted by the master clock module, locks the output clock of the clock module to the first synchronous clock, and performs a phase-locked loop zero-delay correction to the output clock with the first synchronous clock such that, the input and output clocks are in the same phase. At this point, the clock to be detected feeds the corrected output clock back to the master clock module as a feedback clock. In particular, the frequency of the output clock may be different from that of the first synchronous clock, but the frequency offset is identical with each other. It should be noted that in an embodiment of the present disclosure, the clock module to be detected may perform the phase correction with the zero-delay feature of the phase-locked loop. Alternatively, the clock module to be detected may not perform the phase correction with the zero-delay feature of the phase-locked loop, and may subsequently correct the error in phase by an algorithm. A person having ordinary skills in the art, is able to perform the error correction for the slave clock module in various manners without devoting creative efforts.

It should be noted that the clock frequency of the feedback clock is not fixed to a particular frequency, but the frequency may be set to 1 Hz, several KHz or several tens of MHz, or the like, and may be also set to be a multiple of the downlink synchronous clock frequency and may be varied according to the actual situation. One or more second physical links may be provided. It is not intended to specifically limit the number of the second physical links in the embodiment of the present disclosure, and the number may be varied as desired.

In some embodiments, the delay is determined based on a feedback clock, a self-loop back clock and delay parameters which include a delay parameter corresponding to the first physical link and a delay parameter corresponding to the second physical link. It should be noted that the self-loop back clock is a self-loop back clock of the master clock module. The self-loop back clock may be acquired via an additional self-feedback line in the master clock module, or may be acquired by internal feedback of the clock chip of the master clock module.

It should be noted that the clock frequency of the synchronous clock may not be fixed to a specific frequency, and the frequency may be set to 1 Hz, several KHz or several tens of MHz, or the like, and which may be varied according to the actual situation. One or more first physical links may be provided. It is not intended to specifically limit the number of the first physical links in the embodiment of the present disclosure, and the number may be varied as desired.

In some cases, the first physical link and the second physical link are usually implemented as physical boards of the same type. However, the first physical link and the second physical link are implemented as physical boards of different types in an embodiment of the present disclosure.

In some embodiments, the calculating module includes a first calculating sub-module, a second calculating sub-module, a third calculating sub-module and a fourth calculating sub-module.

The first calculating sub-module is configured for acquiring the phase relationship between the feedback clock and the self-loop back clock.

The second calculating sub-module is configured for determining the corresponding delay value based on the phase relationship.

The third calculating sub-module is configured for acquiring a delay parameter which is determined based on a routing distance and a physical board parameter of each of the first physical link and the second physical link.

The fourth calculating sub-module is configured for determining a delay based on the delay value and the delay parameter.

In some embodiments, the first calculating sub-module acquiring the phase relationship between the feedback clock and the self-loop back clock, includes the following.

The first calculating sub-module selects clock data from the feedback clock and performs a phase detection on the clock data with the self-loop back clock to determine the phase relationship.

In some embodiments, the first calculating sub-module is configured for acquiring at least two phase relationships between the feedback clock and the self-loop back clock.

The second calculating sub-module is configured for determining at least two corresponding delay values based on the at least two phase relationships.

In some embodiments, the master clock chip in the master clock module performs the phase detection on at least two clock data from the feedback clock with the self-loop back clock by an internal phase detector, generates a phase difference respectively, and completes the delay sampling. For example, if the phase is detected 4000 times per second, 4000 samples are thus acquired, that is, 4000 phase relationships are generated, and 4000 delay values can be acquired based on these 4000 phase relationships. These 4000 delay values may be different from each other, or some of them may be the same while the others may be different, and also these 4000 delay values may be the same with each other, but this seldom happens. It should be noted that, one phase detector may be provided, or more than one phase detector may be provided for fast acquisition of the phase relationship. The number of the phase detector may be varied as needed.

In some embodiments, the phase detection is performed through the internal feedback of the clock chip instead of the external feedback, based on the special functions of the clock chip. The phase detection may be performed in various manners, such as measuring the cumulative number of pulses by a high-multiplier clock counter, measuring with an exclusive-or gate, or the like. It is not intended to limit how the phase detection is performed in this embodiment, and a person having ordinary skills in the art is able to perform the phase detection in various manners without devoting creative efforts. The frequency of phase detection is not limited to 4000 times per second, but may be ranged from once every few seconds to tens of thousands of times per second, which may be varied as needed.

In some embodiments, the fourth calculating sub-module is configured for processing at least two delay values based on a predetermined rule to generate a processed delay value, and determining the delay based on the processed delay value and the delay parameter.

In some embodiments, since a plurality of delay values are generated, the generated delay values can be stored in the storage module first, and the generated delay values are read after all sampling data is recorded (i.e., after all the required phase relationships between the feedback clock and the self-loop back clock are acquired, and after the corresponding delay values are determined based on the phase relationships), and are processed based on a predetermined rule to generate a processed delay value. It should be noted that the predetermined rule can be a sampling calculation method, an average calculation, a smooth filtering operation, a proportional integration operation, or the like. It is not intended to limit a particular operation or filtering for calculation of the delay in this embodiment. A person having ordinary skills in the art is able to perform a calculation of the delay based on the processed delay values, without devoting creative effort.

In some embodiments, in case that the physical board parameters of the first physical link and the second physical link are the same, while the physical links are in the same operating environment, then the delay parameter of each physical link is only related to the respective routing distance of each physical link.

It should be noted that the physical board parameters of the board are not only related to the line width control and impedance matching caused by the production process of the board, but are also related to the operating temperature and power supply voltage.

In some embodiments, the clock delay detection device further includes a determination module which is configured for, prior to the calculating module determines the delay of the clock module to be detected, acquiring at least one of following, an operating state of the clock module to be detected, a temperature of the clock module to be detected, a voltage of the clock module to be detected, or a determination as to whether a manual configuration presents in the clock module to be detected; in response to a presence of at least one of following, the operating state of the clock module to be detected is interrupted, the temperature of the clock module to be detected exceeds a predetermined temperature threshold, the voltage of the clock module to be detected exceeds a predetermined voltage threshold, or a manual configuration presents in the clock module to be detected, the calculating module determines the delay of the clock to be detected.

In some embodiments, the master clock module can sense and mark the presence or absence of signals, power, clock frequency and other information from the feedback clock. One master clock module can be connected with a plurality of clock modules to be detected. In case that a plurality of clock modules to be detected are presented, the master clock module may read comprehensive information from each clock module to be detected through the feedback clock fed back by each clock module to be detected, and performed a determination to acquire the operating state of each clock module to be detected, and in turn the operating state of the service card to which the clock to be detected belongs. In addition, the master clock module can also feed back the in-place status, clock status, accuracy information and other information of the service card to which a respective one of the clock modules to be detected belongs, to an control plane management interface of an operating system in time. It can be understood that the above information may be read by the control plane management interface of the operating system as well.

Power consumption can be reduced by determining the delay of the clock to be detected in response to a presence of at least one of following, the operating state of the clock module to be detected is interrupted, the temperature of the clock module to be detected exceeds a predetermined temperature threshold, the voltage of the clock module to be detected exceeds a predetermined voltage threshold, a manual configuration presents in the clock module to be detected, or the like, since the measurement of the delay is performed only when one of the above situations presents.

The embodiment of the present disclosure provides a clock delay detection device, the transmitting module transmits the first synchronous clock of the clock module to be detected through the first physical link, the receiving module receives the adjusted feedback clock based on the phase of the first synchronous clock and transmitted by the clock module to be detected through the second physical link, and the calculating module determines the delay of the clock module to be detected, based on the feedback clock, the self-loop back clock, the delay parameter corresponding to the first physical link, and the delay parameter corresponding to the second physical link. The clock delay detection device according to an embodiment of the present disclosure, by taking into account the delay presents in the master clock module itself and the delay caused by the physical characteristics of the first physical link and the second physical link, the error in detection of the delay caused by the clock distribution of switch apparatus can be further reduced, thus improving the accuracy of clock delay detection.

In some embodiments, during the determination of the delay parameters, the physical board parameters of the boards of the first physical link and the second physical link are taken into account, which can further reduce the errors caused by the slight differences in manufacturing processes that lead to the substantial inconsistencies in the line width control, the impedance matching and the single preset standard delay between the first physical link and the second physical link. Also, the error caused by the actual delay of the first physical link and the second physical link being substantially inconsistent with the preset standard delay under different temperature conditions and power supply voltage conditions can be reduced.

In some embodiments, before determination of the delay of the clock module to be detected, information and data are acquired by the determination module, such as the operating state of the clock module to be detected, the temperature of the clock module to be detected, the voltage of the clock module to be detected, and whether a manual configuration presents in the clock module to be detected. And a further determination is performed as to whether or not at least one of following conditions presents, the operating state of the clock module to be detected is interrupted, the temperature of the clock module to be detected exceeds a predetermined temperature threshold, the voltage of the clock module to be detected exceeds a predetermined voltage threshold, a manual configuration presents in the clock module to be detected, or the like. The waste of resources caused by continuous delay measurement can be avoided. The detection efficiency is further improved. Meanwhile, when the switching apparatus is in an environment with unstable temperature or in an environment with large fluctuation of power supply, the method according to an embodiment of the present disclosure can detect the delay change in time, automatically detect the delay, and improve the accuracy of the delay detection.

Embodiment Five

Figure 14:
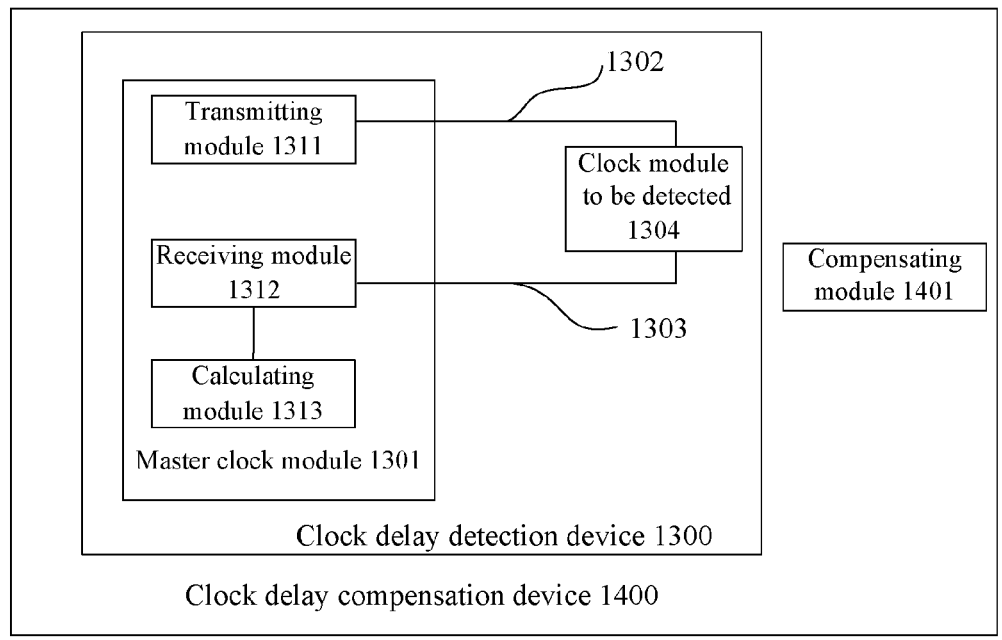
FIG. 14 depicts a schematic diagram of components of a clock delay compensation device according to embodiment five of the present disclosure.

Referring to FIG. 14, a clock delay compensation device 1400 according to this embodiment includes, a clock delay detection device 1300 and a compensating module 1401, as described in any one of the embodiments above.

The compensating module 1401 is configured for acquiring a delay detected by the clock delay detection device 1300 and compensating the delay to the clock module to be detected 1304 corresponding to the delay.

It should be noted that the compensation of the delay to the clock module to be detected corresponding to the delay can be performed either manually or automatically.

In some embodiments, the compensating module further includes, a first compensating module, which is configured for compensating the delay to a constant delay memory of the clock module to be detected through a management interface, and the clock module to be detected removes the delay in the subsequent clock synchronization calculation; or, a second compensating module, which is configured for modifying the phase of a second synchronous clock such that the second synchronous clock received by the clock module to be detected has been compensated for the delay, the second synchronous clock is the clock generated by adjustment of the first synchronous clock based on the delay; or, a third compensating module, which is configured for modifying an output phase of a local clock of the clock module to be detected based on the delay.

It can be understood that the examples of several compensation methods discussed above are all automatic compensation methods. Specifically, automatic compensation can be performed through the following operations.

The master clock module automatically compensates the delay to the constant delay memory of the clock module to be detected through management interfaces such as SGMII, MLVDS, IIC, SPI line, or the like.

Subsequently, the clock module to be detected removes the constant delay during clock synchronization calculation.

The phase of the first synchronous clock transmitted by the master clock module to any one of clock modules to be detected is directly modified.

The local clock output phase of the clock module to be detected is directly modified to align with the first synchronous clock phase.

It should be noted that, a person having ordinary skills in the art is able to perform the automatic compensation of the clock delay in various manners without devoting creative effort.

In the clock delay compensation device according to the embodiment of the present disclosure, the delay provided in any one of the above embodiments is acquired and compensated to the clock to be detected. Delay with higher accuracy is compensated to the clock to be detected, so that the reliability of clock synchronization accuracy is guaranteed.

Furthermore, the embodiment of the present disclosure also provides an embodiment of automatic delay compensation. By means of automatic compensation, the uncontrollable delay error resulting from manual compensation can be greatly reduced, the delay error accuracy can be improved, and the clock synchronization accuracy of the switching apparatus can be greatly improved.

Embodiment Six

Figure 15:
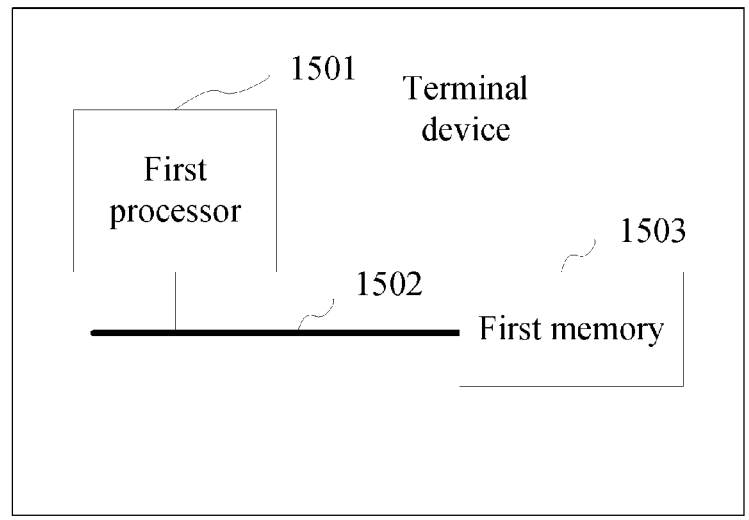
FIG. 15 depicts a schematic diagram of components of a terminal device according to embodiment six of the present disclosure.

This embodiment provides a terminal device, as shown in FIG. 15, which includes a first processor 1501, a first memory 1503 and a first communication bus 1502.

The first communication bus 1502 is configured for implementing the connection and communication between the first processor 1501 and the first memory 1503.

The first processor 1501 is configured for executing one or more first computer programs stored in the first memory 1503, so as to carry out at least one operation of the clock delay detection method in the above embodiments.

Embodiment Seven

Figure 16:
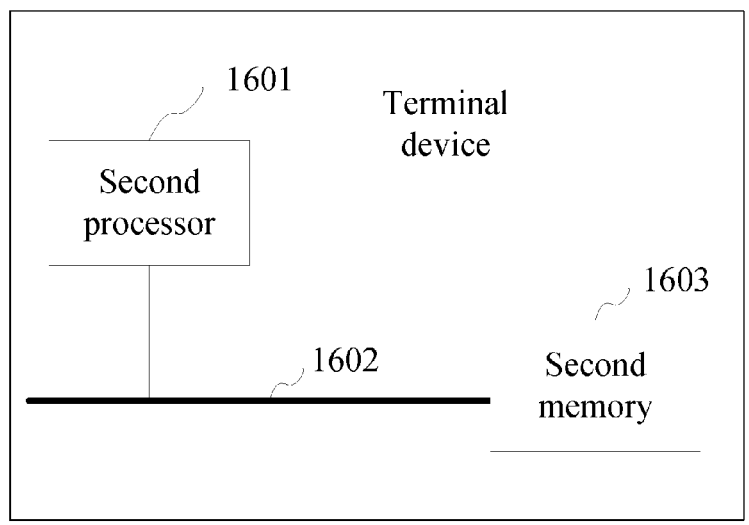
FIG. 16 depicts a schematic diagram of components of another terminal device according to embodiment seven of the present disclosure.

This embodiment provides a terminal device, as shown in FIG. 16, which includes, a second processor 1601, a second memory 1603 and a second communication bus 1602.

The second communication bus 1602 is configured for implementing the connection and communication between the second processor 1601 and the second memory 1603.

The second processor 1601 is configured for executing one or more second computer programs stored in the second memory 1603, so as to carry out at least one operation of the clock delay compensation method in the above embodiments.

This embodiment also provides a non-transitory computer-readable storage medium including volatile or non-volatile, removable or non-removable media implemented in any method or technology for storing information such as computer-readable instructions, data structures, computer program modules or other data. Computer readable storage media include, but are not limited to, RAM (Random Access Memory), ROM (Read-Only Memory), EEPROM (Electrically Erasable Programmable Read Only Memory), Erasable programmable read-only memory), flash memory or other memory, CD-ROM (compact disc read-only memory), digital versatile disc (DVD) or other optical disc storage, magnetic box, magnetic tape, magnetic disc storage or other magnetic storage devices, or any other medium that can be used to store desired information and can be accessed by a computer.

The non-transitory computer-readable storage medium in this embodiment can be used to store one or more first computer programs, and the stored one or more first computer programs can be executed by the first processor to carry out at least one operation of the clock delay detection method in the above embodiments; alternatively, the non-transitory computer-readable storage medium stores one or more second computer programs, and the stored one or more second computer programs can be executed by one or more second processors to carry out the operations of the clock delay compensation method in the above embodiments.

This embodiment also provides a computer program (or computer software), which can be distributed in a computer-readable medium and executed by a computable device to carry out at least one operation of the clock delay detection method or clock delay compensation method in the above embodiments. And in some cases, at least one of the operations shown or described may be performed in a different order from that described in the above embodiments.

It should be understood that in some cases, at least one of the operations shown or described may be performed in a different order from that described in the above embodiments.

This embodiment also provides a computer program product, including a computer-readable device on which the computer program as described above is stored. In this embodiment, the computer-readable device may include the non-transitory computer-readable storage medium as described above.

It can be seen that a person having ordinary skills in the art should understand that all or some of the operations, systems and functional modules/units in the methods disclosed above may be implemented as software (which can be implemented by computer program codes executable by computing devices), firmware, hardware and their appropriate combinations. In the hardware implementation, the division between functional modules/units mentioned in the above description does not necessarily correspond to the division of physical components. For example, a physical component may have multiple functions, or a function or step can be performed by several physical components in cooperation. Some or all physical components may be implemented as software executed by a processor, such as a central processing unit, a digital signal processor or a microprocessor, or as hardware, or as an integrated circuit, such as an application specific integrated circuit.

Furthermore, it is well known to a person having ordinary skills in the art that communication media usually contain computer-readable instructions, data structures, computer program modules or other data in modulated data signals such as carrier waves or other transmission mechanisms, and may include any information delivery media. Therefore, the present disclosure is not limited to any specific combination of hardware and software.

In the embodiments of the present disclosure, there are provided a clock delay detection method, a compensation method, a device, a terminal device and a non-transitory readable storage medium, in the clock delay detection method, the first synchronous clock of the clock module to be detected is transmitted through the first physical link, the adjusted feedback clock based on the phase of the first synchronous clock and transmitted by the clock module to be detected through the second physical link is received, and the delay of the clock module to be detected is determined based on the feedback clock, the self-loop back clock, the delay parameter corresponding to the first physical link and the delay parameter corresponding to the second physical link. By taking into account the delay presents in the master clock module itself and the delay caused by the physical characteristics of the first physical link and the second physical link, the error in detection of the delay caused by the clock distribution of switch apparatus can be further reduced, thus improving the accuracy of clock delay detection. Furthermore, an embodiment of the present disclosure also provides a clock delay compensation method, which can improve the accuracy of clock synchronization and reduce the error of clock synchronization by compensating the delay acquired by the clock delay detection method to the clock module to be detected.

The above content is a further detailed description of the embodiments of the present disclosure in conjunction with detailed embodiments, and it cannot be considered that the specific implementation of the present disclosure is only limited to these descriptions. For a person having ordinary skills to which the present disclosure belongs, various simple deductions or substitutions can be made without departing from the concept of the present disclosure, all of which should be regarded as falling within the scope of protection of the present disclosure.

The invention claimed is:

1. A clock delay detection method, comprising,
   transmitting a first synchronous clock to a clock module to be detected through a first physical link;
   receiving a feedback clock transmitted by the clock module to be detected through a second physical link, wherein the feedback clock is a clock generated by adjusting a phase of a current clock of the clock module to be detected, to be the same as a phase of the first synchronous clock; and
   determining a delay of the clock module to be detected, wherein the delay is determined based on the feedback clock, a self-loop back clock, and delay parameters, wherein the delay parameters include a delay parameter corresponding to the first physical link, and a delay parameter corresponding to the second physical link;
   wherein determining the delay of the clock module to be detected comprises, acquiring a phase relationship between the feedback clock and the self-loop back clock;
   determining a corresponding delay value based on the phase relationship;
   acquiring the delay parameters, wherein the delay parameters are determined based on a routing distance and a physical board parameter of each of the first physical link and the second physical link; and
   determining the delay based on the delay value and the delay parameters.

2. The clock delay detection method according to claim 1, wherein acquiring the phase relationship between the feedback clock and the self-loop back clock comprises,
   selecting clock data from the feedback clock, and performing a phase detection on the clock data with the self-loop back clock to determine the phase relationship.

3. The clock delay detection method according to claim 2, wherein prior to determining the delay of the clock module to be detected, the method further comprises,
acquiring at least one of following, an operating state of the clock module to be detected, a temperature of the clock module to be detected, a voltage of the clock module to be detected, or a determination as to whether a manual configuration presents in the clock module to be detected; and
determining the delay of the clock to be detected, in response to a presence of at least one of following, an operating state of the clock module to be detected is interrupted, a temperature of the clock module to be detected exceeds a predetermined temperature threshold, a voltage of the clock module to be detected exceeds a predetermined voltage threshold, or a manual configuration presents in the clock module to be detected.

4. The clock delay detection method according to claim 1, wherein acquiring the phase relationship between the feedback clock and the self-loop back clock, and determining the corresponding delay value based on the phase relationship comprises,
acquiring at least two phase relationships between the feedback clock and the self-loop back clock, and
determining a corresponding delay value based on each of the at least two phase relationships.

5. The clock delay detection method according to claim 4, wherein determining the delay based on the delay value and the delay parameters comprises,
processing the at least two delay values based on a predetermined rule to generate a processed delay value; and
determining the delay based on the processed delay value and the delay parameters.

6. The clock delay detection method according to claim 4, wherein prior to determining the delay of the clock module to be detected, the method further comprises,
acquiring at least one of following, an operating state of the clock module to be detected, a temperature of the clock module to be detected, a voltage of the clock module to be detected, or a determination as to whether a manual configuration presents in the clock module to be detected; and
determining the delay of the clock to be detected, in response to a presence of at least one of following, an operating state of the clock module to be detected is interrupted, a temperature of the clock module to be detected exceeds a predetermined temperature threshold, a voltage of the clock module to be detected exceeds a predetermined voltage threshold, or a manual configuration presents in the clock module to be detected.

7. The clock delay detection method according to claim 5, wherein prior to determining the delay of the clock module to be detected, the method further comprises,
acquiring at least one of following, an operating state of the clock module to be detected, a temperature of the clock module to be detected, a voltage of the clock module to be detected, or a determination as to whether a manual configuration presents in the clock module to be detected; and
determining the delay of the clock to be detected, in response to a presence of at least one of following, an operating state of the clock module to be detected is interrupted, a temperature of the clock module to be detected exceeds a predetermined temperature threshold, a voltage of the clock module to be detected exceeds a predetermined voltage threshold, or a manual configuration presents in the clock module to be detected.

8. The clock delay detection method according to claim 1, wherein prior to determining the delay of the clock module to be detected, the method further comprises,
acquiring at least one of following, an operating state of the clock module to be detected, a temperature of the clock module to be detected, a voltage of the clock module to be detected, or a determination as to whether a manual configuration presents in the clock module to be detected; and
determining the delay of the clock to be detected, in response to a presence of at least one of following, an operating state of the clock module to be detected is interrupted, a temperature of the clock module to be detected exceeds a predetermined temperature threshold, a voltage of the clock module to be detected exceeds a predetermined voltage threshold, or a manual configuration presents in the clock module to be detected.

9. The clock delay detection method according to claim 1, wherein prior to determining the delay of the clock module to be detected, the method further comprises,
acquiring at least one of following, an operating state of the clock module to be detected, a temperature of the clock module to be detected, a voltage of the clock module to be detected, or a determination as to whether a manual configuration presents in the clock module to be detected; and
determining the delay of the clock to be detected, in response to a presence of at least one of following, an operating state of the clock module to be detected is interrupted, a temperature of the clock module to be detected exceeds a predetermined temperature threshold, a voltage of the clock module to be detected exceeds a predetermined voltage threshold, or a manual configuration presents in the clock module to be detected.

10. A clock delay compensation method, comprising, acquiring the delay according to a clock delay detection method, comprising,
transmitting a first synchronous clock to a clock module to be detected through a first physical link;
receiving a feedback clock transmitted by the clock module to be detected through a second physical link, wherein the feedback clock is a clock generated by adjusting a phase of a current clock of the clock module to be detected, to be the same as a phase of the first synchronous clock; and
determining a delay of the clock module to be detected, wherein the delay is determined based on the feedback clock, a self-loop back clock, and delay parameters, wherein the delay parameters include a delay parameter corresponding to the first physical link, and a delay parameter corresponding to the second physical link;
wherein determining the delay of the clock module to be detected comprises, acquiring a phase relationship between the feedback clock and the self-loop back clock;
determining a corresponding delay value based on the phase relationship;

acquiring the delay parameters, wherein the delay parameters are determined based on a routing distance and a physical board parameter of each of the first physical link and the second physical link; and determining the delay based on the delay value and the delay parameters; and compensating the delay to the clock module to be detected corresponding to the delay.

11. The clock delay compensation method according to claim 10, wherein compensating the delay to the clock module to be detected corresponding to the delay comprises, compensating the delay to a constant delay memory of the clock module to be detected through a management interface, and removing the delay by the clock module to be detected in a subsequent clock synchronization calculation; or modifying a phase of the second synchronous clock such that the second synchronous clock received by the clock module to be detected has been compensated for the delay, wherein the second synchronous clock is a clock generated by adjustment of the first synchronous clock based on the delay; or modifying an output phase of a local clock of the clock module to be detected, based on the delay.

12. A clock delay detection device, comprising, a master clock module, a first physical link, a second physical link, and a clock module to be detected; wherein, the master clock module comprises a transmitting module, a receiving module, and a calculating module, wherein, the transmitting module is configured to transmit a first synchronous clock to the clock module to be detected through the first physical link;

the receiving module is configured to receive a feedback clock transmitted by the clock module to be detected through the second physical link, and the feedback clock is a clock generated by adjustment of a phase of a current clock of the clock module to be detected to be the same as a phase of the first synchronous clock; and the calculating module is configured to determine a delay of the clock module to be detected, the delay is determined based on the feedback clock, a self-loop back clock, and delay parameters including a delay parameter corresponding to the first physical link and a delay parameter corresponding to the second physical link;

wherein the calculating module comprises a first calculating sub-module module, a second calculating sub-module, a third calculating sub-module, and a fourth calculating sub-module, wherein, the first calculating sub-module is configured to acquire a phase relationship between the feedback clock and the self-loop back clock;

the second calculating sub-module is configured to determine a corresponding delay value based on the phase relationship;

the third calculating sub-module is configured to acquire the delay parameters, and the delay parameters are determined based on a routing distance and a physical board parameter of each of the first physical link and the second physical link; and the fourth calculating sub-module is configured to determine the delay based on the delay value and the delay parameters.

13. The clock delay detection device according to claim 12, wherein the first calculating sub-module configured to acquire the phase relationship between the feedback clock and the self-loop back clock comprises, the first calculating sub-module selects clock data from the feedback clock and performs a phase detection on the clock data with the self-loop back clock to determine the phase relationship.

14. The clock delay detection device according to claim 12, wherein the first calculating sub-module is configured to acquire at least two phase relationships between the feedback clock and the self-loop back clock, and the second calculating sub-module is configured to determine a corresponding delay value based on each of the at least two phase relationships.

15. The clock delay detection device according to claim 14, wherein the fourth calculating sub-module is configured to process the at least two delay values based on a predetermine rule to generate a processed delay value, and to determine the delay based on the processed delay value and the delay parameters.

16. The clock delay detection device according to claim 12, further comprising, a determination module configured to, acquire, prior to the calculating module determines the delay of the clock module to be detected, at least one of following, an operating state of the clock module to be detected, a temperature of the clock module to be detected, a voltage of the clock module to be detected, or a determination as to whether a manual configuration presents in the clock module to be detected; and the calculating module is configured to determine the delay of the clock module to be detected, in response to a presence of at least one of following, an operating state of the clock module to be detected is interrupted, a temperature of the clock module to be detected exceeds a predetermined temperature threshold, a voltage of the clock module to be detected exceeds a predetermined voltage threshold, or a manual configuration presents in the clock module to be detected.

17. A clock delay compensation device, comprising the clock delay detection device according to claim 12 and a compensating module, wherein the compensating module is configured to acquire the delay detected by the clock delay detection device and to compensate for the delay to the clock module to be detected corresponding to the delay.

18. The clock delay compensation device according to claim 17, wherein the compensating module further comprises, a first compensating module, configured to compensate for the delay to a constant delay memory of the clock module to be detected through a management interface, and the delay is removed by the clock module to be detected during a subsequent clock synchronization calculation; or a second compensating module, configured to modify a phase of the second synchronous clock such that the second synchronous clock received by the clock module to be detected has been compensated for the delay, and the second synchronous clock is a clock generated by adjustment of the first synchronous clock based on the delay; or a third compensating module, configured to modify an output phase of a local clock of the clock module to be detected based on the delay.

* * * * *